United States Patent
Scales et al.

(10) Patent No.: US 9,726,906 B2
(45) Date of Patent: Aug. 8, 2017

(54) POLYMERS AND NANOGEL MATERIALS AND METHODS FOR MAKING AND USING THE SAME

(71) Applicant: Johnson & Johnson Vision Care, Inc., Jacksonville, FL (US)

(72) Inventors: Charles W. Scales, St. Augustine, FL (US); Kevin P. McCabe, St. Augustine, FL (US); Brent Matthew Healy, Jacksonville Beach, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 14/948,474

(22) Filed: Nov. 23, 2015

(65) Prior Publication Data

US 2016/0077360 A1    Mar. 17, 2016

Related U.S. Application Data

(62) Division of application No. 13/899,694, filed on May 22, 2013, now Pat. No. 9,244,196.

(60) Provisional application No. 61/651,767, filed on May 25, 2012, provisional application No. 61/771,961, filed on Mar. 4, 2013.

(51) Int. Cl.
| | |
|---|---|
| *C08J 7/00* | (2006.01) |
| *G02B 1/04* | (2006.01) |
| *G02B 1/00* | (2006.01) |
| *C08L 53/00* | (2006.01) |
| *G02C 7/04* | (2006.01) |

(52) U.S. Cl.
CPC ............. *G02C 7/049* (2013.01); *G02B 1/043* (2013.01); *G02C 2202/16* (2013.01)

(58) Field of Classification Search
None
See application file for complete search history.

(56) References Cited

U.S. PATENT DOCUMENTS

| | | |
|---|---|---|
| 3,408,429 A | 10/1968 | Wichterle |
| 3,660,545 A | 5/1972 | Wichterle |
| 3,808,178 A | 4/1974 | Gaylord |
| 4,018,853 A | 4/1977 | Le Boeuf et al. |
| 4,113,224 A | 9/1978 | Clark et al. |
| 4,120,570 A | 10/1978 | Gaylord |
| 4,136,250 A | 1/1979 | Mueller et al. |
| 4,139,513 A | 2/1979 | Tanaka et al. |
| 4,153,641 A | 5/1979 | Deichert et al. |
| 4,168,112 A | 9/1979 | Ellis et al. |
| 4,190,277 A | 2/1980 | England |
| 4,197,266 A | 4/1980 | Clark et al. |
| 4,287,175 A | 9/1981 | Katz |
| 4,321,261 A | 3/1982 | Ellis et al. |
| 4,436,730 A | 3/1984 | Ellis et al. |
| 4,495,313 A | 1/1985 | Larsen |
| 4,557,264 A | 12/1985 | Hinsch |
| 4,663,409 A | 5/1987 | Friends et al. |
| 4,680,336 A | 7/1987 | Larsen et al. |
| 4,740,533 A | 4/1988 | Su et al. |
| 4,889,664 A | 12/1989 | Kindt-Larsen et al. |
| 4,910,277 A | 3/1990 | Bambury et al. |
| 5,006,622 A | 4/1991 | Kunzler et al. |
| 5,034,461 A | 7/1991 | Lai et al. |
| 5,039,459 A | 8/1991 | Kindt-Larsen et al. |
| 5,070,215 A | 12/1991 | Bambury et al. |
| 5,177,165 A | 1/1993 | Valint, Jr. et al. |
| 5,219,965 A | 6/1993 | Valint, Jr. et al. |
| 5,244,981 A | 9/1993 | Seidner et al. |
| 5,256,751 A | 10/1993 | Vanderlaan |
| 5,260,000 A | 11/1993 | Nandu et al. |
| 5,311,223 A | 5/1994 | Vanderlaan |
| 5,314,960 A | 5/1994 | Spinelli et al. |
| 5,319,589 A | 6/1994 | Yamagata et al. |
| 5,321,108 A | 6/1994 | Kunzler et al. |
| 5,331,067 A | 7/1994 | Seidner et al. |
| 5,352,714 A | 10/1994 | Lai et al. |
| 5,371,147 A | 12/1994 | Spinelli et al. |
| 5,385,996 A | 1/1995 | Rizzardo et al. |
| 5,387,662 A | 2/1995 | Kunzler et al. |
| 5,451,617 A | 9/1995 | Lai et al. |

(Continued)

FOREIGN PATENT DOCUMENTS

| | | |
|---|---|---|
| CN | 101163991 A | 4/2008 |
| CN | 10166334 A | 3/2010 |

(Continued)

OTHER PUBLICATIONS

Babmann-Schnitzler et al, Sortion properties of hydophobically modifed poly(acylic acids) as natural organic matter model substances to pyrene, Colloids and Surfaces A: Physiocochem. Eng. Aspects 260 (2005) 119-128.

Bannister, et al, "Development of Branching in Living Radical Copolymerization of Vinly and Divinyl Monomers", Macromolecules 2006, vol. 39, pp. 7483-7492.

Burchard, "Particle Scattering Factors of Some Branched Polymers", Macromolecules 1977, vol. 10, No. 5, pp. 919-927.

Burchard, "Solution Properties of Branched Macromolecules", Advances in Polymer Science, 1999, vol. 143, pp. 113-194.

(Continued)

*Primary Examiner* — Peter A Salamon
(74) *Attorney, Agent, or Firm* — Raef M. Shaltout

(57) ABSTRACT

Provided are articles such as medical devices which comprise at least one water soluble, crosslinked copolymer. The primary polymer chains of the copolymer are hydrophilic and independently have a degree of polymerization in the range of about 10 to about 10,000. The water soluble, crosslinked copolymers of the present invention are free from terminal substrate associating segments. The copolymers may be incorporated into a formulation from which the article is made or may be contacted with the article post-formation.

47 Claims, 1 Drawing Sheet

(56) References Cited

U.S. PATENT DOCUMENTS

| | | | |
|---|---|---|---|
| 5,525,691 A | 6/1996 | Valint, Jr. et al. |
| 5,539,016 A | 7/1996 | Kunzler et al. |
| 5,700,559 A | 12/1997 | Sheu et al. |
| 5,723,255 A | 3/1998 | Texter et al. |
| 5,760,100 A | 6/1998 | Nicolson et al. |
| 5,805,264 A | 9/1998 | Janssen et al. |
| 5,874,511 A | 2/1999 | Rizzardo et al. |
| 5,942,558 A | 8/1999 | Korb |
| 5,944,853 A | 8/1999 | Molock et al. |
| 5,962,548 A | 10/1999 | Vanderlaan et al. |
| 5,998,498 A | 12/1999 | Vanderlaan et al. |
| 6,020,445 A | 2/2000 | Vanderlaan et al. |
| 6,087,412 A | 7/2000 | Chabrecek et al. |
| 6,087,415 A | 7/2000 | Vanderlaan et al. |
| 6,099,852 A | 8/2000 | Jen |
| 6,277,365 B1 | 8/2001 | Ellis et al. |
| 6,367,929 B1 | 4/2002 | Maiden et al. |
| 6,428,839 B1 | 8/2002 | Kunzler et al. |
| 6,433,061 B1 | 8/2002 | Marchant et al. |
| 6,458,142 B1 | 10/2002 | Faller et al. |
| 6,637,929 B2 | 10/2003 | Baron |
| 6,794,486 B2 | 9/2004 | Adam et al. |
| 6,822,016 B2 | 11/2004 | McCabe et al. |
| 6,858,310 B2 | 2/2005 | McGee et al. |
| 6,867,245 B2 | 3/2005 | Iwata et al. |
| 7,109,276 B2 | 9/2006 | Wilczewska et al. |
| 7,553,880 B2 | 6/2009 | Nicolson et al. |
| 7,566,746 B2 | 7/2009 | Winterton et al. |
| 7,592,341 B2 | 9/2009 | Tomich et al. |
| 7,705,067 B2 | 4/2010 | Winterton et al. |
| 7,786,185 B2 | 8/2010 | Rathore et al. |
| 7,807,755 B2 | 10/2010 | Farnham et al. |
| 7,816,454 B2 | 10/2010 | Higashira et al. |
| 7,816,464 B2 | 10/2010 | Farcet |
| 7,841,716 B2 | 11/2010 | McCabe et al. |
| 8,158,695 B2 | 4/2012 | Vanderlaan et al. |
| 8,273,366 B2 | 9/2012 | Chauhan et al. |
| 8,337,551 B2 | 12/2012 | Linhardt et al. |
| 9,125,808 B2 | 9/2015 | Alli et al. |
| 9,170,349 B2 | 10/2015 | Mahadevan et al. |
| 2002/0016383 A1 | 2/2002 | Iwata et al. |
| 2003/0125498 A1 | 7/2003 | McCabe et al. |
| 2003/0162862 A1 | 8/2003 | McCabe et al. |
| 2004/0116310 A1 | 6/2004 | Kunzler et al. |
| 2004/0208983 A1 | 10/2004 | Hill et al. |
| 2005/0031793 A1 | 2/2005 | Moeller et al. |
| 2005/0085561 A1 | 4/2005 | Phelan et al. |
| 2005/0176911 A1 | 8/2005 | Zanini et al. |
| 2005/0192610 A1 | 9/2005 | Houser et al. |
| 2005/0208102 A1 | 9/2005 | Schultz |
| 2006/0063852 A1 | 3/2006 | Iwata et al. |
| 2006/0072069 A1 | 4/2006 | Laredo et al. |
| 2006/0187410 A1 | 8/2006 | Sato et al. |
| 2007/0116740 A1 | 5/2007 | Valint, Jr. et al. |
| 2007/0122540 A1 | 5/2007 | Salamone et al. |
| 2007/0155851 A1 | 7/2007 | Alli et al. |
| 2007/0232783 A1 | 10/2007 | Moad et al. |
| 2008/0045612 A1 | 2/2008 | Rathore et al. |
| 2008/0143957 A1 | 6/2008 | Linhardt et al. |
| 2008/0151236 A1 | 6/2008 | Prince et al. |
| 2008/0174035 A1 | 7/2008 | Winterton |
| 2008/0273168 A1 | 11/2008 | Rathore et al. |
| 2008/0307751 A1 | 12/2008 | Newman et al. |
| 2008/0314767 A1 | 12/2008 | Lai et al. |
| 2009/0029043 A1 | 1/2009 | Rong et al. |
| 2009/0108479 A1 | 4/2009 | Lai et al. |
| 2009/0141236 A1 | 6/2009 | Chen et al. |
| 2009/0142292 A1 | 6/2009 | Blackwell et al. |
| 2009/0168012 A1* | 7/2009 | Linhardt et al. ........... 351/160 H |
| 2009/0169716 A1 | 7/2009 | Linhardt et al. |
| 2009/0171049 A1 | 7/2009 | Linhardt et al. |
| 2009/0171459 A1 | 7/2009 | Linhardt et al. |
| 2009/0173044 A1 | 7/2009 | Linhardt et al. |
| 2009/0176676 A1 | 7/2009 | Hilvert et al. |
| 2009/0186229 A1 | 7/2009 | Muller et al. |
| 2010/0048847 A1 | 2/2010 | Broad |
| 2010/0069522 A1* | 3/2010 | Linhardt et al. .............. 522/112 |
| 2010/0099829 A1 | 4/2010 | Parakka |
| 2010/0137548 A1 | 6/2010 | Moad et al. |
| 2010/0140114 A1 | 6/2010 | Pruitt et al. |
| 2010/0162661 A1* | 7/2010 | Vanderbilt et al. .............. 53/425 |
| 2010/0168852 A1* | 7/2010 | Vanderbilt et al. .......... 623/6.62 |
| 2010/0168855 A1 | 7/2010 | McGee et al. |
| 2010/0249356 A1 | 9/2010 | Rathore |
| 2010/0296049 A1* | 11/2010 | Justynska et al. ........ 351/160 H |
| 2010/0298446 A1 | 11/2010 | Chang et al. |
| 2010/0315588 A1 | 12/2010 | Nunez et al. |
| 2010/0317809 A1 | 12/2010 | Linhardt et al. |
| 2010/0317816 A1 | 12/2010 | Linhardt et al. |
| 2010/0317817 A1 | 12/2010 | Linhardt et al. |
| 2010/0318185 A1 | 12/2010 | Nunez et al. |
| 2011/0102736 A1 | 5/2011 | Wu et al. |
| 2011/0112267 A1 | 5/2011 | Jakubowski et al. |
| 2011/0166248 A1 | 7/2011 | Hsu et al. |
| 2011/0189291 A1 | 8/2011 | Yang et al. |
| 2011/0230589 A1 | 9/2011 | Maggio et al. |
| 2011/0237766 A1 | 9/2011 | Maggio et al. |
| 2011/0275734 A1* | 11/2011 | Scales et al. .................. 523/107 |
| 2011/0293522 A1 | 12/2011 | Wang et al. |
| 2012/0026457 A1 | 2/2012 | Qiu et al. |
| 2012/0109613 A1 | 5/2012 | Boyden et al. |
| 2013/0203812 A1 | 8/2013 | Raja et al. |

FOREIGN PATENT DOCUMENTS

| | | |
|---|---|---|
| DE | 4143239 A1 | 7/1993 |
| DE | 4337492 C2 | 6/1999 |
| EP | 0080539 B1 | 6/1983 |
| EP | 1803754 A2 | 7/2007 |
| EP | 1918310 A1 | 5/2008 |
| JP | 10512000 | 11/1998 |
| JP | 2009520219 A | 5/2009 |
| JP | 2009175543 A | 8/2009 |
| JP | 2010508902 A | 3/2010 |
| JP | 2011510350 A | 3/2011 |
| JP | 2011518347 A | 6/2011 |
| JP | 2012504182 A | 2/2012 |
| JP | 2012508809 A | 4/2012 |
| JP | 2012522111 A | 9/2012 |
| RU | 233470 C1 | 9/2008 |
| RU | 2008131301 | 2/2010 |
| TW | 203617 | 4/1993 |
| TW | 200519450 | 6/2005 |
| TW | 200914496 | 4/2009 |
| TW | 201024083 | 7/2010 |
| TW | 201026752 | 7/2010 |
| TW | 201206999 | 2/2012 |
| WO | 9631792 A1 | 10/1996 |
| WO | 9729788 A1 | 8/1997 |
| WO | 0171392 A1 | 9/2001 |
| WO | 03022321 A2 | 3/2003 |
| WO | 03022322 A2 | 3/2003 |
| WO | 2004040337 A1 | 5/2004 |
| WO | 2004056909 A1 | 7/2004 |
| WO | 2006057823 A1 | 6/2006 |
| WO | 2007070653 A2 | 6/2007 |
| WO | 2008061992 A2 | 5/2008 |
| WO | 2008112874 A1 | 9/2008 |
| WO | 2008124093 A1 | 10/2008 |
| WO | 2009085754 A1 | 7/2009 |
| WO | 2009085755 A1 | 7/2009 |
| WO | 2009085759 A1 | 7/2009 |
| WO | 2009089207 A1 | 7/2009 |
| WO | 2009117374 A1 | 9/2009 |
| WO | 2010039653 A1 | 4/2010 |
| WO | 2010056686 A1 | 5/2010 |
| WO | 2010117588 A1 | 10/2010 |
| WO | 2011071791 A1 | 6/2011 |
| WO | 2011140318 A1 | 11/2011 |
| WO | 2012016096 A1 | 2/2012 |
| WO | 2012016098 A1 | 2/2012 |
| WO | 2012151135 A1 | 11/2012 |

(56) References Cited

FOREIGN PATENT DOCUMENTS

| WO | 2012170603 A1 | 12/2012 |
|---|---|---|
| WO | 2013074535 A1 | 5/2013 |
| WO | 2014093299 A1 | 6/2014 |

OTHER PUBLICATIONS

Burchard, et al, "Information on Polydispersity and Branching from Combined Quasi-Elastic and Integrated Scattering", Macromolecules 1980, vol. 13, pp. 1265-1272.

Crivello, et al, Photoinitiators for Free Radical Cationic & Anionic Photopolymerisation, 2nd Edition, vol. III, pp. 275-298, John Wiley and Sons, New York, 1998.

Encyclopedia of Polymer Science and Engineering, N-Vinyl Amide Polymers, Second edition, vol. 17, pp. 198-257, John Wiley & Sons Inc. 1989.

Gao, et al. "Synthesis of functional polymers wth controlled architecture by CRP of monomers in the presence of cross-linkers: From stars to gels", Progress in Polymer Science 2009, vol. 34, pp. 317-350.

Huan et al: "Synthesis and Properties of Polydimethylsiloxane-Containing Block Copolymers via Living Radical Polymerization", Journal of Polymer Science: Part A: Polymer Chemistry, vol. 39, 2001, pp. 1833-1842.

ISO 18369-4:2006: Ophthalmic optics—Contact lenses—Part 4: Physicochemical properties of contact lens materials.

ISO 9913-1: 1996(E).

Karunakaran et al, Synthesis, Characterization, and Crosslinking of Methacrylate-Telechelic PDMAAm-b-PDMS-b-PDMAAm Copolymers, Journal of Polymer Science: Part A: Polymer Chemistry, vol. 45, 4284-4290 (2007), Wiley Periodicals, Inc.

Lowe et al: "Reversible addition-fragmentation chain transfer (RAFT) radical polymerization and the synthesis of water-soluble (co)polymers under homogeneous conditions in organic and aqueous media", Prog. Polym. Sci. 32 (2007) 283-351.

McDowall et al: "Synthesis of Seven-Arm Poly(vinyl pyrrolidone) Star Polymers with Lysozyme Core Prepared by MADIX/RAFT Polymerization", Macromolecular Rapid Communication, vol. 29, 2008, pp. 1666-1671.

Mosmann, Rapid Colorimetric Assay for Cellular Growth and Survival: Application to Proliferation and Cytotoxicity Assays, Journal of Immunological Methods, 65 (1983) 55-63.

Pavlovic et al: "Synthesis and characterization of hydrophilic silicone copolymers and macromonomers for opthalmic application", Database accession No. 2008:955522; & Abstracts of Papers, 236th ACS National Meeting, philadelphia, PA, US, Aug. 17-21, 2008, POLY-113 Publisher: American Chemical Society, Washington, DC 2008.

PCT International Preliminary Report on Patentability, dated Nov. 5, 2013, for PCT Int'l Appln. No. PCT/US2012/035722.

PCT International Preliminary Report on Patentability, dated Nov. 25, 2014, for PCT Int'l Appln. No. PCT/US2013/042628.

PCT International Preliminary Report on Patentability, dated Nov. 25, 2014, for PCT Int'l Appln. No. PCT/US2013/042644.

PCT International Preliminary Report on Patentability, dated Nov. 25, 2014, for PCT Int'l Appln. No. PCT/US2013/042658.

PCT International Preliminary Report on Patentability, dated Nov. 15, 2012, for PCT Int'l Appln. No. PCT/US2011/035324.

PCT International Preliminary Report on Patentability,dated Nov. 25, 2014, for PCT/US2013/040066.

PCT International Search Report, dated Mar. 6, 2014, for PCT Int'l Appln. No. PCT/US2013/040066.

PCT International Search Report, dated Feb. 26, 2014, for PCT Int'l Appln. No. PCT/US2013/042628.

PCT International Search Report, dated May 27, 2014, for PCT Int'l Appln. No. PCT/US2013/042658.

PCT International Search Report, dated Aug. 11, 2011, for PCT Int'l Appln. No. PCT/US2011/035324.

PCT International Search Report, dated Jul. 11, 2012, for PCT Int'l Appln. No. PCT/US2012/035722.

PCT International Search Report, dated Oct. 29, 2013, for PCT Int'l Appln. No. PCT/US2013/042644.

Shedge et al, Hydrophobically Modifed Poly(acrylic acid) Using 3-Pentadecylcyclohexylamine: Synthesis and Rheology, Macromolecular Chemistry and Physics 2005, 206, 464-472.

Sugiyama, et al, "Evaluation of biocompatibility of the surface of polyethylene films modified with various water soluble polymers using Ar plasma-post polymerization technique", Macromolecular Materials and Engineering, (2000), 282, 5-12.

Vo, et al, "RAFT Synthesis of Branched Aacrylic Copolymers", Macromolecules 2007, vol. 40, pp. 7119-7125.

Vogt, et al, "Tuning the Temperature Response of Branched Poly(N-isopropylacrylamide) Prepared by RAFT Polymerization", Macromolecules 2008, vol. 41, pp. 7368-7373.

Wooley, et al, "A 'Branched-Monomer Approach' for the Rapid Synthesis of Dendimers", Angew. Chem. Int. Ed. Engl. 1994, vol. 33, No. 1, pp. 82-85.

A.J. Phillips and J. Stone (Ed.), Contact Lenses. A Textbook for Practitioner and Student, 3rd edition 1989, p. 150

Extended European Search Report dated Feb. 1, 2017 for Application No. EP 16175519.

Green et al., Material Properties That Predict Preservative Uptake for Silicone Hydrogel Contact Lenses, Eye & Contact Lens 38 (Nov. 2012) 350-357.

J.E. Mark (Ed.), Polymer Data Handbook, Oxford University Press 1999, pp. 961-964.

Maldonado-Godina et al, In vitro water wettability of silicone hydrogel contact lenses determined using the sessile drop and captive bubble techniques. Journal of Biomedical Materials Research Part A 83 (2007) 496-502.

Rosa et al., Hydrosoluble Copolymers of Acrylamide-(2-acrylamido-2-methylpropanesulfonic acid). Synthesis and Characterization by Spectroscopy and Viscometry, Journal of Applied Polymer Science 87 (2003) 192-198.

Saito et al., Synthesis and Hydrophilicity of Multifunctionally Hydroxylated Poly(acrylamides). Macromolecules 1996, 29, 313-319.

Subbaraman et al., Kinetics of in vitro Lysozyme Deposition on Silicone Hydrogel, Group II and Group IV Contact Lens Materi- als. Investigative Ophthalmology & Visual Science 46 (May 2005).

Travas-Sejdic et al, Study of Free-Radical Copolymerization of Acrylamide with 2-Acrylamido-2-methyl-1-propane Sulphonic Acid. Journal of Applied Polymer Science 75 (2000) 619-628.

* cited by examiner

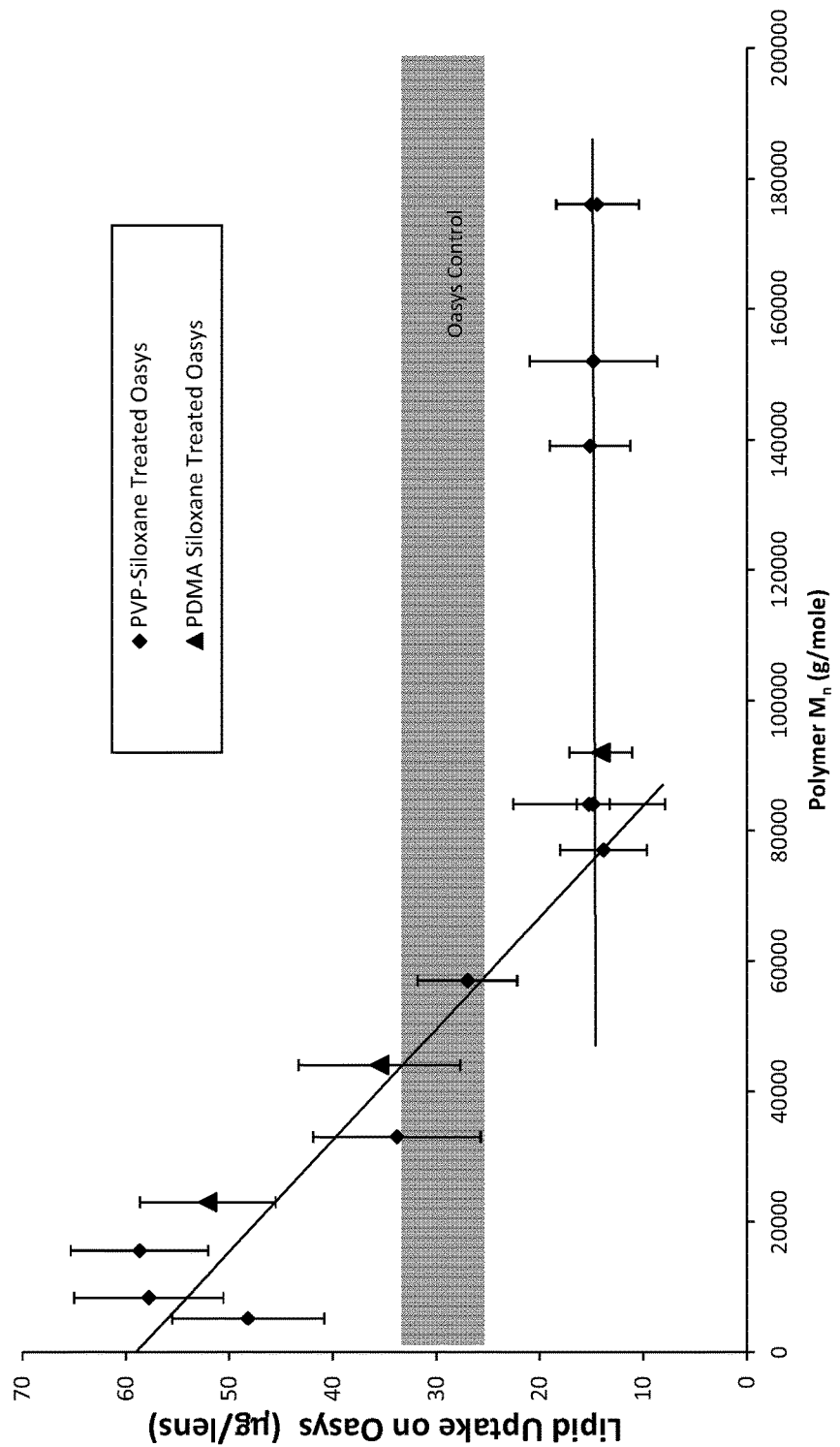

POLYMERS AND NANOGEL MATERIALS AND METHODS FOR MAKING AND USING THE SAME

RELATED APPLICATIONS

This application is a division of U.S. patent application Ser. No. 13/899,694 filed May 22, 2013; currently pending, which claims priority to U.S. Provisional Patent Application No. 61/651,767, filed on May 25, 2012, entitled "POLYMERS AND NANOGEL MATERIALS AND METHODS FOR MAKING AND USING THE SAME"; and U.S. Provisional Patent Application No. 61/771,961, filed on Mar. 4, 2013, entitled "POLYMERS AND NANOGEL MATERIALS AND METHODS FOR MAKING AND USING THE SAME," the contents of which are incorporated by reference.

TECHNICAL FIELD

The present invention relates to copolymers that are cross-linked but not macroscopically gelled. The copolymers do not have separate terminal segments which can associate with a polymeric substrate. Such copolymers can be amphiphilic or hydrophilic. Nanogel materials are also provided. These copolymers and nanogel materials may be incorporated into a variety of substrates, including medical devices, to improve the wettability and lubricity and inhibit protein and/or lipid uptake thereof.

BACKGROUND

Contact lenses have been used commercially to improve vision since the 1950s. The first contact lenses were made of hard materials. Although these lenses are currently used, they are not widely used due to their poor initial comfort and their relatively low permeability to oxygen. Later developments in the field gave rise to soft contact lenses, based upon hydrogels. Many users find soft lenses are more comfortable, and increased comfort levels allow soft contact lens users to wear their lenses for longer hours than users of hard contact lenses.

Another class of available contact lenses is silicone hydrogel contact lenses. Silicone-containing components are combined with conventional hydrogel components to form silicone hydrogels which display increased oxygen permeability compared to conventional hydrogels. However, some silicone hydrogels display undesirably high contact angles and protein uptake compared to conventional hydrogel lenses.

Various compounds have been disclosed as suitable for treating preformed silicone hydrogel contact lenses including surface active segmented block copolymers, substantially water-soluble silicone-containing surfactants, functionalized hybrid PDMS/polar amphipathic copolymer block systems, including polydimethylsiloxane-PVP block copolymers and (meth)acrylated polyvinylpyrrolidone. U.S. Patent Appln. Ser. No. 2011/0275734 is directed to "non-reactive, hydrophilic polymers having terminal siloxanes," which have linear or branched hydrophilic segments. There remains a need for methods for improving the properties of contact lenses and particularly silicone hydrogel contact lenses.

SUMMARY OF THE INVENTION

The present invention relates to compositions comprising, consisting and consisting essentially of at least one hydrophilic nanogel material comprising, consisting and consisting essentially of one or more cross-linked copolymers, wherein said copolymer comprises, consists and consists essentially of one or more primary polymer chain having a degree of polymerization in the range of about 10 to about 10,000, and wherein said hydrophilic nanogel material (a) associates, with a surface and (b) is free from terminal substrate associating segments.

The present invention further relates to ophthalmic devices comprising, consisting and consisting essentially of at least one silicone-containing polymer and at least one water soluble, cross-linked copolymer comprising, consisting and consisting essentially of a plurality of primary polymer chains each having a degree of polymerization in the range of about 10 to about 10,000, wherein said copolymer is associated with at least one surface of said ophthalmic device and provides said ophthalmic device with a reduction in lipid uptake compared to the silicone-containing polymer of at least about 20%.

The present invention relates to a process comprising, consisting and consisting essentially of contacting a contact lens with a solution comprising, consisting and consisting essentially of a lipid uptake reducing amount of at least one water soluble, crosslinked copolymer under contacting conditions suitable to associate said copolymer with said contact lens; wherein said cross-linked copolymer comprises, consists and consists essentially of a plurality of crosslinked primary polymer chains each having a degree of polymerization in the range of about 10 to about 10,000, wherein said crosslinked copolymer does not comprise repeating units comprising a carboxylic acid group bonded directly to the polymer backbone. The present invention further related to a process comprising, consisting and consisting essentially of: forming a reaction mixture comprising at least one hydrophilic component, at least and at least one water soluble, cross-linked copolymer comprising, consisting and consisting essentially of a plurality of primary polymer chains each having a degree of polymerization in the range of about 10 to about 10,000, and curing said reaction mixture to form a contact lens. The compositions of the present invention comprising, consisting and consisting essentially of water soluble, crosslinked polymers having primary chains, represented by the formula

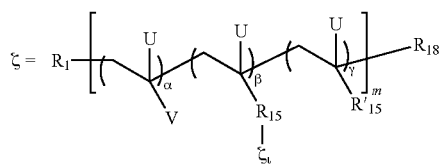

wherein $R_1$ is a divalent group selected from the group consisting of optionally substituted alkylene; optionally substituted saturated, unsaturated or aromatic carbocyclic or heterocyclic rings; optionally substituted alkylthio; optionally substituted alkoxy; or optionally substituted dialkylamino;

U is independently selected from the group consisting of hydrogen, halogen, $C_1$-$C_4$ alkyl which may be optionally substituted with hydroxyl, alkoxy, aryloxy (OR"), carboxy, acyloxy, aroyloxy ($O_2CR"$), alkoxy-carbonyl, aryloxy-carbonyl ($CO_2R"$) and combinations thereof.

V is independently selected from the group consisting of R", —$CO_2R"$, —COR", —CN, —$CONH_2$, —CONHR", —CONR"$_2$, —O$_2$CR", —OR", cyclic and acyclic N-vinyl amides and combinations thereof;

R" is independently selected from the group consisting of optionally substituted C$_1$-C$_{18}$ alkyl, C$_2$-C$_{18}$ alkenyl, aryl, heterocyclyl, alkaryl wherein the substituents are independently selected from the group that consists of epoxy, hydroxyl, alkoxy, acyl, acyloxy, carboxy, carboxylate, sulfonic acid, and sulfonate, alkoxy- or aryloxy-carbonyl, isocyanato, cyano, silyl, halo, dialkylamino; phosphoric acids, phosphates, phosphonic acids, phosphonates and combinations thereof; R$_{15}$' and R$_{15}$ are residues of hydrophilic, free radical reactive cross-linking agents;

R$_{18}$ is a controlled radical polymerization agent and in some embodiments R$_{24}$ is selected from the group consisting of monovalent RAFT agents, ATRP agents, TERP agents and NMP agents;

$\zeta_i$ is another primary chain, are mole fractions, and a is equal to about 0.85 to about 0.999, β is not 0, and the mole fractions of β and γ combined are about 0.15 to about 0.001. In another embodiment the compositions of the present invention comprise, consist and consist essentially of water soluble, crosslinked polymers having primary chains, ζ, represented by the formula

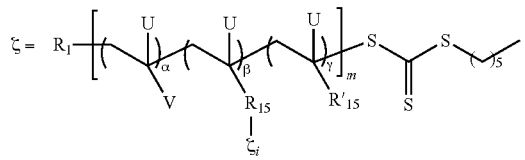

Wherein R$_1$, U, V, R$_{15}$, R$_{15}$', α, β, γ and m are as defined above.

The compositions impart excellent wettability and lubricity along with reduced protein and/or lipid update, and polymeric articles associated with the same. Methods of making and using these compositions are also disclosed. Compositions comprise semi-crosslinked, ungelled copolymer which may be crosslinked after formation of the polymer chains, or may be derived from copolymerization of at least one ethylenically unsaturated monomer with a polyfunctional ethylenically unsaturated monomer. Such copolymers can be used as nanogel compositions that contain at least one stable, block copolymer that is cross-linked but not macroscopically gelled. The copolymers when preformed prior to crosslinking have a degree of polymerization of in the range of about 10 to about 10,000. The copolymers of the present application may be included in the reactive mixture from which the ophthalmic device is made, or may be associated with ophthalmic device after the ophthalmic device is formed. Incorporation of at least one copolymer of the present invention on or in the ophthalmic device provides an improvement in at least one property of said ophthalmic device, such as a reduction in lipid uptake compared to only the substrate, of at least about 20%. The copolymers can be can be amphiphilic or hydrophilic.

Also provided are methods of inhibiting or reducing lipid uptake by a contact lenses, the methods comprising contacting the contact lenses with a solution comprising at least one water soluble, crosslinked copolymer having a degree of polymerization of about 10 to about 10,000, under conditions to entrap or associate said water soluble, crosslinked copolymer with said contact lens.

DESCRIPTION OF THE DRAWINGS

The FIGURE is a graph of the molecular weight vs. lipid uptake for senofilcon A lenses treated with PVP-Siloxane copolymers.

DETAILED DESCRIPTION

Before describing several exemplary embodiments of the invention, it is to be understood that the invention is not limited to the details of construction or process steps set forth in the following description. The invention is capable of other embodiments and of being practiced or being carried out in various ways.

It has been found that despite advances made by the use of previously developed non-reactive, hydrophilic polymers having terminal siloxanes, which have linear, branched or combed hydrophilic segments, in reducing lipid and/or protein uptake and enhancing lubricity and wettability of contact lenses, a limit on improved properties is reached as molecular weight increases. The FIGURE depicts this limit with respect to molecular weight. From the plot in the FIGURE, it is apparent that for senofilcon A lenses treated with PVP-Siloxane copolymers with increasing molecular weights, the lipid uptake decreases to a minimal level of about 15 μg/lens when the hydrophilic PVP segment reaches a molecular weight of about 80 kDa. For lenses treated with PVP-Siloxane copolymers with molecular weights above 80 kDa, no additional reduction in lipid uptake on senofilcon A is observed.

Surprisingly, it has been found that polymer nanogels having cross-linked or "bridged" hydrophilic segments, without separate substrate associating segments can lead to contact lenses with improved properties, for example, reduced lipid and protein update as well as lower friction. Also, it is thought that choice of cross-linking agent and degree of cross-linking can be tailored according to desired applications and specific substrate material.

As used herein "associated" means that the copolymer is retained in or on the substrate without covalent bonding. Associated may include physical retention, such as entanglement or anchoring, or hydrogen bonding, van der Waals forces, dipole-dipole interactions, electrostatic attraction, and combinations of these effects. It has been surprisingly found that the association between the semi-crosslinked block copolymers and the substrate is persistent, and is maintained even with digital rubbing. When the substrate is a contact lens, the semi-crosslinked block copolymers are retained in and/or on the contact lenses through the desired wear cycle, including in embodiments where the contact lens is a reusable lens, through cleaning with a digital rub.

As used herein "associative segment" means a portion of the terminal segment of the polymer that is retained or associated in or on a surface, region, or segment of a substrate. An associative segment can be hydrophilic or hydrophobic.

As used herein "non-reactive" means the WSC polymer lacks functional groups which form covalent bonds under the reaction, storage and use conditions. For example, when the hydrophilic polymer is contacted with a substrate such as a contact lens before autoclaving, very few (less than 1 wt %) of the WSC polymers contain residual reactive groups. Even if residual groups were present, the contacting conditions lack the initiators necessary to catalyze free radical reactions. Thus, the WSC is incapable of forming covalent bonds with the substrate. It will be appreciated by those of skill in the art that while a very small number of WSC polymer (less than 5 wt %, and less than 1 wt %) may have a residual reactive group, there are too few residual reactive groups to associate desirable or functional amounts of the crosslinked nanogel with the substrate. The vastly predominating effect keeping the WSC polymer associated with the substrate is entrapment of at least a portion of the WSC polymer.

The term "cross-linked" refers to the attachment of a polymer chain to one or more polymer chain(s) via a bridge or multiple bridges, composed of either an element, a group or a compound, that join certain carbon atoms of the chains by primary bonds, including covalent, ionic and hydrogen bonds. In various embodiments of the invention disclosed herein, cross-linking may occur via covalent bonding, ionic bonding, hydrogen bonding, or the like. An exemplary embodiment of covalent cross-linking would include the in situ formation of cross-links during a free-radical copolymerization of a mono-vinyl monomer and monomer containing multiple (i.e. 2 or more) vinyl substituents. Such a polymerization would result in the covalent cross-linking of multiple polymer chains to each other and (depending on the extent of monomer conversion and molar quantity of the cross-linker) the formation of a macroscopic gel.

Ionic cross-linking of polymer chains may occur in situ (i.e. during polymerization) or post-polymerization. The latter case may occur when an aqueous solution containing a polymeric cationic material is added to an aqueous solution containing a polymeric anionic material. Upon mixture of the two ionic polymers, polymer-polymer complexation along with small-counter-ion liberation occurs, leading to the formation of ionically cross-linked polymer-polymer complexes. The solubility of such complexes is predominately governed by the stoichiometry of positive and negative charge. Formation of such ionic cross-links between polyanionic and polycationic materials in solution is well known to those skilled in the art. The former case of ionic cross-linking may occur when a mono-vinyl monomer is copolymerized with a di-vinyl cross-linker that is composed of two ethylenically unsaturated monomers which are connected to each other via an ionic bond. Such "ionic cross-linkers" may be formed by combining an ethylenically unsaturated monomer containing an acidic (e.g. a carboxylic acid) moiety with an ethylenically unsaturated monomer containing a basic moiety (e.g. a tertiary amine) through simple acid/base chemistry to form a monomer-monomer complex or divinyl covalent organic salt.

In the context of the disclosed invention, cross-linking via hydrogen bonding may occur when a polymer with multiple proton-donating moieties is combined in solution with a polymer with multiple proton-accepting moieties. In such embodiments, the two polymers are able to form soluble or insoluble complexes, depending on the ratio of proton-donating groups to proton-accepting groups in the complex, as well as the abundance of additional solubilizing or non-solubilizing moieties present on the polymer chains.

As used herein "nanogel" means submicron hydrogel particles which are soluble or indefinitely dispersible at room temperature in aqueous solutions. The solubility of a solution may be confirmed by making a 1 wt % of the crosslinked nanogel in water and filtering the solution through a 0.45 micron nylon syringe filter, such as those available from Whatman or Pall Membranes. Aqueous solutions (2 and in some cases 5 wt %) may be desirable. Solutions which are soluble will maintain at least about 90% and in some embodiments at least about 95%, 99% of said nanogel in solution. In one or more embodiments, the solutions are clear. In one embodiment the aqueous solution is at least about 50 weight % water or lens packing solution, in some embodiments at least about 70 weight %, in other embodiments at least about 90 weight %, in other embodiments least about 99 weight %, and in other embodiments least about 99.5 weight %.

The water soluble, crosslinked (WSC) polymers or nanogels are in a macroscopically ungelled state, making them soluble in aqueous solutions, including ophthalmic solutions and compositions. The WSC polymers are generally in an ungelled state at the temperature at which they are associated or incorporated into the ophthalmic solution or composition. For ophthalmic devices such as contact lenses, it may not be necessary for the WSC polymer to be ungelled once it is incorporated or associated with the contact lens. However, for ophthalmic solutions, the WSC polymer generally remains ungelled throughout storage, and in some embodiments, use. Small quantities of gelled polymer (less than about 5 wt %) may be acceptable, and in some solutions, if the amount of gelled polymer is too great, it can be removed by processes known in the art, such as filtration.

Embodiments of water soluble, crosslinked polymers provided herein are randomly cross-linked among and along the hydrophilic polymer chains. Agents used for cross-linking are termed cross-linking agents or cross-linkers.

As used herein, "at least partially hydrophobic polymer matrices" are those which comprise repeating units derived from hydrophobic components such as hydrophobic monomers, macromers and prepolymers. Hydrophobic components are those which are not soluble in water, and which when homopolymerized or polymerized with only other hydrophobic components have contact angles with respect to, for example, ophthalmic solutions such as wetting solutions of greater than about 90°. Examples of at least partially hydrophobic polymer matrices include contact lenses formed from PMMA, silicones, silicone hydrogels (both coated and uncoated), stents, catheters and the like. Examples of hydrophobic monomers, macromers and prepolymers are known and include monomers, macromers and prepolymers containing silicone groups, siloxane groups, unsubstituted alkyl groups, aryl groups and the like. Specific examples include silicone containing components such as monomethacryloxypropyl terminated mono-n-butyl terminated polydimethylsiloxanes (800-1000 MW) (mPDMS), monomethacryloxypropyl terminated mono-n-methyl terminated polydimethylsiloxanes, TRIS, methyl methacrylate, lauryl methacrylate, and the like.

As used herein, "stable" means that the compound does not undergo a change through a single autoclaving cycle of 121° C. for 30 minutes which would deleteriously affect the desired properties of either the wetting agent or the combination of the wetting agent and polymer substrate. For example, ester bonds between the siloxane segment and the polymer segment are in some embodiments undesirable. The autoclaving may be conducted dry or in the presence of an ophthalmically compatible saline solution, such as, but not limited to borate or phosphate buffered saline.

As used herein, "near-monodisperse" means a polydispersity index (PDI) of 1.5 or less and refers to an individual primary chain degree of polymerization and/or MW within a cluster of cross-linked amphiphilic primary chains. In some embodiments, the polymers display polydispersities of less than about 1.3, and in others in the range of about 1.05 to about 1.3. It should be appreciated by those skilled in the art that the individual near-monodisperse primary chains are statistically cross-linked to one another during polymerization, and as such, the resulting water soluble, cross-linked, polymer clusters will have polydispersity values in excess of 1.5.

As used herein, "degree of polymerization" means the number of repeating units per polymer molecule or polymeric segment. For example, in one or more embodiments, the copolymers of the present invention (prior to crosslinking) can have a degree of polymerization in the range of about 10 to about 10,000 (or about 50 to about 5000, or about 300 to about 5000, or about 500 to about 2000, or about 100 to about 1000, or about 100 to about 500, or about 100 to about 300).

As used herein, "cross-linker to primary chain molar ratio" (XL:ζ-PC) refers to the number of moles of cross-linker used during preparation of the copolymer in a ratio with the number of moles of primary chain used in the preparation. The number of primary chains is determined by the molar amount of controlled radical polymerization (CRP) agent, or control agent, present. Specific embodiments include a cross-linker to primary chain molar ratio in the range of about 0.005 to about 10 (or about 0.1 to about 5, or about 0.1 to about 1.5, or about 0.1 to about 1.25). Exemplary CRP agents include, but are not limited to: reversible addition fragment transfer (RAFT) agents; atom transfer radical polymerization (ATRP) agents; telluride-mediated polymerization (TERP) agents; and/or nitroxide-mediated living radical polymerization (NMP) agents.

As used herein, "segment" or "block" refers to a section of polymer having repeating units with similar properties, such as composition or hydrophilicity.

As used herein, "silicone segment" refers to —[SiO]—. The Si atom in each —[SiO]—repeating unit may be alkyl or aryl substituted, are preferably substituted with $C_{1-4}$ alkyl, and in one embodiment are substituted with methyl groups to form a dimethylsiloxane repeating unit.

As used herein a "hydrophilic associative segment" is hydrophilic, but can associate with the substrate via hydrogen, or ionic bonding. For example, for lenses which comprise a proton acceptor such as DMA, NVP or PVP, the hydrophilic associative segment comprises proton donating groups. In this example, suitable proton donating groups include 4-acrylamidobutanoic acid (ACAII), N-hydroxyalkyl (meth)acrylamide monomers such as N-(2-hydroxypropyl) methacrylamide, and N-(2,3-dihydroxypropyl) methacrylamide; or vinyl bezoic acid. It is a benefit of the present invention that the crosslinked nanogels do not comprise separate associative segments, because the primary chains are themselves capable of associating with the selected substrate.

As used herein "hydrophilic" polymers or monomers are those which yield a clear single phase when mixed with water at 25° C. at a concentration of at least about 10 wt %.

As used herein, "complexing segments" or "complexing groups" include functional group pairs that exhibit strong non-covalent interactions, e.g. alkyl or aryl boronic acids that interact strongly with diol functional groups or biotin and avidin binding. In one embodiment, the complexing segments may comprise monomers such as (4-vinylphenyl) boronic acid, (3-acrylamidophenyl)boronic acid, or (4-acrylamidophenyl)boronic acid or N-(2-acrylamidoethyl)-5-((3 aS,4 S,6aR)-2-oxohexahydro-1H-thieno[3,4-d]imidazol-4-yl)pentanamide.

As used herein, "stimuli responsive components" include those which undergo a physical or chemical change in response to a change in environmental conditions. Conditions which can induce a change include pH, light, salt concentration, temperature, combinations thereof and the like. Examples of monomers which can be used to prepare stimuli responsive components include but are not limited to N-isopropylacrylamide, vinyl bezoic acid, or acrylamidobutanoic acid (ACAII), and the like.

As used herein "substrate" refers to an article, such as a sheet, film, tube or more complex form such as biomedical devices.

As used herein, a "biomedical device" is any article that is designed to be used while either in or on mammalian tissues or fluid. Examples of these devices include but are not limited to catheters, implants, stents, sutures, bandages, and ophthalmic devices such as intraocular lenses and contact lenses and the like.

As used herein, the term "lens" refers to ophthalmic devices that reside in or on the eye. These devices can provide optical correction, cosmetic enhancement, UV blocking and visible light or glare reduction, therapeutic effect, including wound healing, delivery of drugs or nutraceuticals, diagnostic evaluation or monitoring, or any combination thereof. The term lens includes, but is not limited to, soft contact lenses, hard contact lenses, intraocular lenses, overlay lenses, ocular inserts, and optical inserts.

As used herein, a "silicone-containing polymer" is any polymer containing silicone or siloxane repeating units. The silicone-containing polymer may be a homopolymer, such as silicone elastomers, or a copolymer such as fluoro-silicones and silicone hydrogels. As used herein, silicone hydrogel refers to a polymer comprising silicone containing repeating units and in some embodiments, a water content of at least about 10%, and in some embodiments at least about 20%.

As used herein "RAFT polymerization" or "RAFT" refers to reversible addition fragmentation-chain transfer polymerization.

As used herein "reactive components" are the components in a polymerization reaction mixture which become part of the structure of the polymer upon polymerization. Thus, reactive components include monomers and macromers which are covalently bound into the polymer network. Diluents and processing aids which do not become part of the structure of the polymer are not reactive components.

As used herein "substituted" refers to alkyl groups which may contain halogens, esters, aryls, alkenes, alkynes, ketones, aldehydes, ethers, hydroxyls, amides, amines and combinations thereof.

As used herein "free radical source" refers to any suitable method of generating free radicals such as the thermally induced homolytic scission of a suitable compound(s) (thermal initiators such as peroxides, peroxyesters, or azo compounds), the spontaneous generation from monomer (e.g., styrene), redox initiating systems, photochemical initiating systems or high energy radiation such as electron beam, X- or gamma-radiation. Chemical species known to act as "free radical sources" are commonly called initiators by those skilled in the art and will be referred to as such for the purposes of this disclosure.

As used herein "proton donating segments" or "proton donating functional groups" are functional groups which have the ability to donate a proton to a proton accepting segment or group under lens forming, autoclaving or storage conditions. Proton donating functional groups include alcohols, acids, primary amides, and the like.

As used herein "proton accepting segments" or "proton accepting functional groups" are functional groups which have the ability to accept a proton under lens forming, autoclaving or storage conditions. Proton accepting groups include amines, amides, carbonyls and the like.

In one embodiment, the WSC polymer of the present invention is a stable polymeric wetting agent, which is free of terminal substrate associating segments. Said polymers are comprised of material or polymer that has an affinity for at least a portion of a medical device and provide the desired improvements in substrate performance. The polymeric wetting agents may beneficially be associated with the substrate in a single step, without prior pretreatment.

Thus, the water soluble, crosslinked polymers are formed from components which are hydrophilic and have an affinity for a given medical device. For example, the water soluble, crosslinked polymers may be formed from components that contain proton donating and proton accepting functional groups. In one such embodiment, the WSC polymers could contain multiple proton donating functional groups, such as alcohols, and thus have an affinity for medical devices or other surfaces which proton are accepting. Conversely, the water soluble, crosslinked polymers could contain multiple proton accepting functional groups, such as amides, and thus have an affinity for medical devices or other surfaces which are proton donating. Yet in other embodiments the WSC polymers could contain multiple ionic functional groups, such as carboxylates, sulfonates, ammonium salts, or phosphonium salts, and thus have an affinity for medical devices with an opposite charge to that of a given ionic the water soluble, crosslinked polymers. In other embodiments the WSC polymers contain functional groups capable of undergoing complexation with other complementary functional groups on a medical device or surface. For example, the water soluble, crosslinked polymers could contain multiple boronic acid functionalities and associate with a medical device or surface which contains multiple hydroxyl groups. In an alternative embodiment, the hydroxyl groups may be contained within the water soluble, crosslinked polymers and be associated with a surface containing multiple boronic acid functional groups. In some embodiments, the water soluble, crosslinked polymer is stimuli responsive and is comprised of functional groups that, when incorporated into polymeric form, cause the resulting polymer to be water-soluble or water-insoluble under different solution conditions. For example, the water soluble, crosslinked polymers might be comprised of a temperature-responsive polymer, such as poly(N-isopropylacrylamide) (PNIPAM), which undergoes a phase-transition in water at 32° C. Therefore, at solution temperatures below 32° C., said PNIPAM polymer is water-soluble and hydrophilic, while at higher solution temperatures (i.e. greater than 32° C.) it is water-insoluble, hydrophobic, and able to associate with a medical device or surface which contains at least one hydrophobe.

In one embodiment, the water soluble, crosslinked polymers formed by the copolymerization of an ethylenically unsaturated monomer with a poly-functional ethylenically unsaturated monomer.

The hydrophilic primary chain, $\zeta$, comprises statistically distributed repeating units of G, D, and E with the following formulae:

Formula I

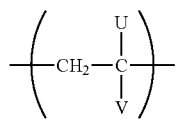

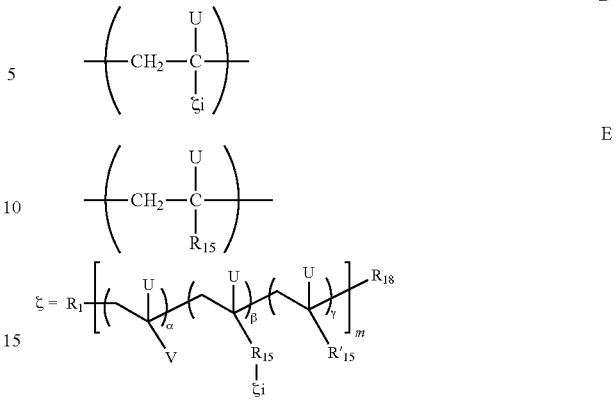

The terms $\alpha$, $\beta$, and $\gamma$, specify the relative molar amounts (in terms of mole fraction) of G, D, and E that comprise the water soluble, crosslinked polymer. In some embodiments, $\alpha$ is equal to about 0.85 to about 0.999, about 0.92 to about 0.999, about 0.95 to about 0.999, and about 0.97 to about 0.999, while the sum of $\beta$ and $\gamma$ for each respective range of $\alpha$ would be equal to about 0.15 to about 0.001, about 0.08 to about 0.001, about 0.05 to about 0.001, and about 0.025 to about 0.001. For the purposes of the disclosed invention, the mole fraction of D in the water soluble, crosslinked polymer, (i.e. $\beta$) of a primary chain is intended to be maximized, compared to that of E (i.e. $\gamma$) thus maximizing the number of cross-links between $\zeta$ and other $\zeta_i$-primary chains, i.e. very few unreacted $R'_{15}$ moieties remain. All mole-fraction ranges of $\alpha$, $\beta$, and $\gamma$ are based on the relative amounts of monomer and cross-linker employed in the monomer feed of a given embodiment and assumes that the reactivity differences between vinyl-substituents on the monomer and cross-linker are minimal, i.e. near-statistical incorporation occurs. In one embodiment, the nanogels of the present are substantially free from unreacted $R'_{15}$ groups. When $R'_{15}$ comprises a double bond, this may be confirmed via FTIR or other methods capable of detecting the presence of double bonds. In one embodiment, $R_{15}$ and $R'_{15}$ are substantially free of siloxane repeating units and in another embodiment are substantially free of silicone.

Structure I may contain a terminal thiocarbonylthio moiety, while in other embodiments, it may not.

U is selected from the group consisting of hydrogen, halogen, $C_1$-$C_4$ alkyl which may be optionally substituted with hydroxyl, alkoxy, aryloxy (OR"), carboxy, acyloxy, aroyloxy ($O_2$CR"), alkoxy-carbonyl, aryloxy-carbonyl ($CO_2$R") and combinations thereof. Preferably, U may be selected from H, or methyl.

V is independently selected from the group consisting of, R", —$CO_2$H, —$CO_2$R", —COR", —CN, —$CONH_2$, —CONHR", —CONR'$_2$, —$O_2$CR", —OR"; plus cyclic and acyclic N-vinyl amides and combinations thereof.

R" is independently selected from the group consisting of optionally substituted $C_1$-$C_{18}$ alkyl, $C_2$-$C_{18}$ alkenyl, aryl, heterocyclyl, alkaryl wherein the substituents are independently selected from the group that consists of epoxy, hydroxyl, alkoxy, acyl, acyloxy, carboxy and carboxylates, sulfonic acids and sulfonates, alkoxy- or aryloxy-carbonyl, isocyanato, cyano, silyl, halo, and dialkylamino; phosphoric acids, phosphates, phosphonic acids, phosphonates. In one embodiment R" is selected from the group consisting of methyl, —$CH_2OH$, —$CH_2CH_2OH$, —$CH_2CH_2CH_2OH$, —CH$_2$—CO$_2^-$, —CH$_2$CH$_2$—CO$_2^-$, —CH$_2$CH$_2$CH$_2$—CO$_2^-$, —CH$_2$CH$_2$CH$_2$CH$_2$—CO$_2^-$, —CH$_2$CH$_2$CH$_2$CH$_2$CH$_2$—CO$_2^-$, —CH$_2$—SO$_3^-$, —CH$_2$CH$_2$—SO$_3^-$, —CH$_2$CH$_2$CH$_2$—SO$_3^-$, —CH$_2$CH$_2$CH$_2$CH$_2$—SO$_3^-$, —CH$_2$CH$_2$CH$_2$CH$_2$CH$_2$—SO$_3^-$, —(CH$_3$)$_2$—CH$_2$—CO$_2^-$, —(CH$_3$)$_2$—CH$_2$—SO$_3$H, —CH$_2$CH$_2$CH$_2$—$^+$N(CH$_3$)$_2$—CH$_2$CH$_2$—CO$_2^-$, —CH$_2$CH$_2$—$^+$N(CH$_3$)$_2$—CH$_2$CH$_2$—CO$_2^-$, —CH$_2$CH$_2$CH$_2$—$^+$N(CH$_3$)$_2$—CH$_2$CH$_2$CH$_2$—SO$_3^-$, —CH$_2$CH$_2$—$^+$N(CH$_3$)$_2$—CH$_2$CH$_2$CH$_2$—SO$_3^-$, —CH$_2$CH$_2$CH$_2$—$^+$N(CH$_3$)$_2$—CH$_2$CH$_2$CH$_2$—PO$_3^{-2}$, —CH$_2$CH$_2$—$^+$N(CH$_3$)$_2$—CH$_2$CH$_2$CH$_2$—PO$_3^{-2}$, —CH$_2$CH$_2$CH$_2$—$^+$N(CH$_3$)$_2$—CH$_2$CH$_2$—PO$_3^{-2}$—CH$_2$CH$_2$—$^+$N(CH$_3$)$_2$—CH$_2$CH$_2$—PO$_3^{-2}$, and combinations thereof and the like. Examples of suitable V groups include pyrrolidonyl, piperidonyl, 2-caprolactam, 3-methyl-2-caprolactam, 3-methyl-2-piperidonyl, 4-methyl-2-piperidonyl, 4-methyl-2-caprolactam, 3-ethyl-2-pyrrolidonyl, 4,5-dimethyl-2-pyrrolidonyl, imidazolyl, N—N-dimethylamido, amido, N,N-bis(2-hydroxyethyl)amido, -cyano, N-isopropyl amido, acetate, -, carboxypolyethylene glycol, N-(2-hydroxypropyl)amido, N-(2-hydroxyethyl)amido, carboxyethyl phosphorylcholine, 3-(dimethyl(4-benzyl)ammonio)propane-1-sulfonate (DMVBAPS), 3-((3-amidopropyl)dimethylammonio)propane-1-sulfonate (AMPDAPS), 3-((3-(carboxy)propyl)dimethylammonio)propane-1-sulfonate (APDAPS), N-methylacetamide, -acetamide, N-methylpropionamide, N-methyl-2-methylpropionamide, 2-methylpropionamide, N,N'-dimethylurea, and the like, and mixtures thereof.

In one embodiment, V comprises —N—(CH$_3$)$_2$, pyrrolidonyl, —CON(CH$_3$)$_2$, N-(2-hydroxyethyl)amido or —N(CH$_3$)COCH$_3$.

R$_1$ can be any chemical moiety or polymer that is capable of initiating free-radical polymerization. In one embodiment, R$^1$ is capable of undergoing reversible termination and fragmentation, e.g. as would be observed under RAFT polymerization conditions, while also retaining the ability to initiate polymerization. R$_1$ may be selected from divalent groups consisting of optionally substituted alkylene; optionally substituted saturated, unsaturated or aromatic carbocyclic or heterocyclic rings; optionally substituted alkylthio; optionally substituted alkoxy; or optionally substituted dialkylamino. In one embodiment, R$_1$ is selected from optionally substituted benzyl, optionally substituted phenyl, ethanoate, optionally substituted propionate, 4-cyanopentanoate, or isobutyroate functionalities. In one embodiment, R$_1$ comprises a 4-cyanopentanoate, isobutanoic, or a benzylic group. In other embodiments, R$_1$ can comprise a cyano-methy or cumyl group. In another embodiment, R$_1$ comprises said functional groups and is polyvalent. Examples of stable copolymers are shown below in Formula VIII with a range of suitable substituents.

R$_{18}$ comprises an agent which is capable of taking part and/or mediating a controlled free radical polymerization (CRP). CRP techniques are well known to those of skill in the art and can include, but are not limited to reversible addition fragmentation chain-transfer polymerization (RAFT), atom transfer radical polymerization (ATRP), nitroxide mediated polymerization (NMP), and Tellurium-mediated radical polymerization (TERP).

In one embodiment, the following copolymer structures may be formed via RAFT and thus contain a thiocarbonyl-thio functional group on the terminus of each primary chain within a ζ-cluster:

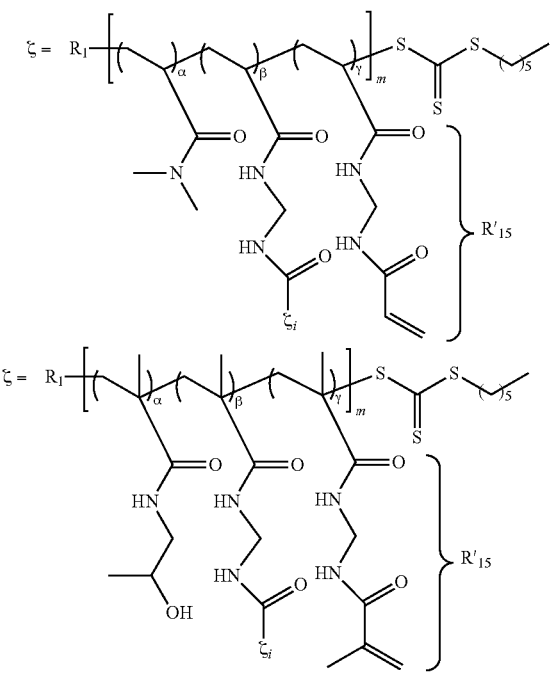

Formula II and III

It should be appreciated that the substitutions described above may be combined in any combination.

The WSC polymer generally has a degree of polymerization in the range of about 10 to about 10,000. In some embodiments, the degree of polymerization is at least about 100, or at least about 300, or even in others at least about 500. In further embodiments, the water soluble, crosslinked polymer has a degree of polymerization within the following ranges: about 300 to about 10,000, about 300 to about 5,000, between about 500 to about 10,000, about 500 to about 5,000 and about 500 to about 2000 and about 700 to about 2000. Degree of polymerization may be obtained from MALDI-TOF, SEC-MALLS, NMR or a combination thereof.

Each ζ-primary chain is cross-linked or semi-cross-linked. That is, unlike previously disclosed art having only linear, branched, or combed structures, the water soluble, crosslinked copolymer is randomly cross-linked via covalent, ionic, or hydrogen-bonds along the polymer. Cross-linking agents have two or more reactive or associative functionalities to react with and/or associate the copolymers of the present invention to one another. The residues of the cross-linking agents are shown in Figure VII as R$_{15}$ and R$_{15}$'. Cross-linking agents comprise free radical reactive functionality, such as vinyl, allyl, (meth)acrylate, (meth)acrylamide and the like. In one embodiment the cross-linking agents are hydrophilic, and in another do not comprise dimethylsiloxane groups, and in another embodiment are free of silicone. Exemplary covalent cross-linking agents include: N,N'-methylenebis(meth)acrylamide; N,N'-ethylenebis(meth)acrylamide; N,N'-propylenebis(meth)acrylamide; N,N'-butylenebis(meth)acrylamide; N,N'-pentamethylenebis(meth)acrylamide; N,N'-hexamethylenebis(meth)acrylamide; all other N,N'-alkylenebis(meth)acrylamides; all polyalkyleneglycoldi(meth)acrylates, including, but not limited to ethylene glycol di(meth)acrylate, triethylene glycol di(meth)acrylate, tetra-ethylene glycol di(meth)acrylate; and all polyalkyleneglycoldi(meth)acrylamides, including, but not limited to N,N'-(oxybis(ethane-2,1-diyl))diacrylamide N,N'-(((oxybis(ethane-2,1-diyl))bis(oxy))bis(ethane-2,1-diyl))

diacrylamide, triallyl cyanurate (TAC), 1,3-divinylimidazolidin-2-one, and 3,3"alkylenebis(1-vinylpyrrolidin-2-one), wherein the alkylene has 1-12 carbons. The WSC polymers of the present invention are water soluble, and non-gelled.

Cross-linking agents which have functionality along the backbone which can be reversibly broken or cleaved can also be used. For example, N,N'-cystamine di(meth)acylamide may be used as a crosslinker. After the semi-crosslinked block copolymer is associated with the substrate, the disulfide bond in cystamine may be cleaved and reformed to create an interpenetrating network which is more intimately entangled in the substrate matrix.

The molar ratio of RAFT agent to cross-linking agent in the cross-linking reaction mixture is greater than about 0.1, greater than about 0.2, greater than about 0.3, greater than about 0.5, greater than about 0.75, greater than about 1, greater than about 2, greater than about 5 and in some cases greater than about 10. In one embodiment the cross-linking agent is free of silicone and the RAFT agent to cross-linking agent in the cross-linking reaction mixture is greater than about 0.1. In embodiments where the cross-linking agent comprises siloxane, the RAFT agent to cross-linking agent in the cross-linking reaction mixture is greater than about 0.3. A molar ratio of the molar amount of cross-linking agent to theoretical primary chains ("XL:ζ-PC") in the cross-linking reaction mixture can be between 0.01:1.0 and 6.0:1.0, with the following non-limiting values of XL:ζ-PC being preferred: 0.1:1.0, 0.2:1.0, 0.25:1.0, 0.3:1.0, 0.4:1.0, 0.5:1.0, 0.55:1.0, 0.6:1.0, 0.7:1.0, 0.75:1.0, 0.8:1.0, 0.9:1.0, 1.0:1.0, 1.2:1.0, 1.25:1.0, 1.5:1.0, 3.0:1.0, 4.0:1.0, 5.0:1.0, 7.5:1.0 or even 10:1.0. In some embodiments it may be desirable to select XL:ζ-PC values which provide WSC polymers across a wide range of temperatures and solution conditions, to allow for ready incorporation into a range of articles and solutions. For example, water soluble cross-linked polymers comprising poly(N-(2-hydroxypropyl) methacrylamide) PHPMA, may desirably have an XL:ζ-PC of less than about 1.25:1 to prevent macroscopic gelling of the polymer. In other embodiments, the XL:ζ-PC for said example may be less than 3:1. Yet in other embodiments, the XL:ζ-PC for said example may be less than 1.5:1. In other embodiments it may be desirable to select XL:ζ-PC values which provide the desired decrease in lipid uptake of the treated substrate, with increasing XL:ζ-PC values, decreasing the lipid uptake levels.

In addition to XL:ζ-PC, another factor that affects the point at which macroscopic gelation occurs is the total monomer concentration. In some embodiments of this invention, the total monomer concentration used can include, but is not limited to 1 to about 80 wt % and about 10 to about 50 wt %, and still further about 20 to about 50 wt %.

Those of skill in the art will appreciate that the number of primary chains formed in a controlled radical polymerization (CRP) system is dictated by the concentration of a controlled radical polymerization (CRP) agent or control agent. In the case of a RAFT polymerization, the control agent would be a thiocarbonylthio functional control agent. In the case of ATRP, the control agent would be a copper ligand complex. For the purposes of the invention disclosed herein, any CRP agent can be employed. In other embodiments, a CRP agent may not be required, so long as nanogel formation is possible, without macroscopic gellation.

In one embodiment, the polymeric wetting agent has the general structure and primary chain designator, ζ, as shown in Formula IA.

Formula IV

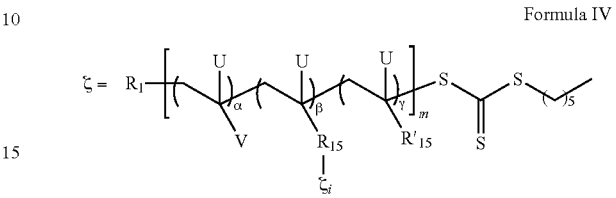

Wherein $R_1$, $R_{15}$, $R'_{15}$, G, D, E, Z, ζ, $ζ_i$, α, β, γ, m, and p are defined below, and may be formed by contacting:

At least one hydrophilic monomer having the formula $H_2C=UV$

At least one RAFT agent of Formula II having a chain transfer constant greater than 0.1;

Formula V $$R_1 \!\!-\!\!\left(\!\!S\!\!-\!\!\overset{S}{\underset{Z}{\diagdown}}\!\!\right)_p$$

(iii) free radicals produced from a free radical source (i.e. an initiator); and (iv) a cross-linking agent, $H_2C=UR_{15}$ Z is selected from the group consisting of hydrogen, chlorine, fluorine, optionally substituted alkyl, optionally substituted aryl, optionally substituted heterocyclyl, optionally substituted alkylthio, optionally substituted alkoxy, optionally substituted alkoxycarbonyl, optionally substituted aryloxycarbonyl (—COOR"), carboxy (—COOH), optionally substituted acyloxy (—O$_2$CR"), optionally substituted carbamoyl (—CONR"$_2$), cyano (—CN), dialkyl- or diaryl-phosphonato [—P(=O)(OR")$_2$], dialkyl- or diaryl-phosphinato [—P(=O)(OR")$_2$], and a polymer chain formed by any mechanism;

p is 1 or an integer greater than 1, 1-5, 3-5 and in some embodiments 1 or 2. When p≥2, then $R_1$ is selected from p-valent moieties derived from any of silicon, sulfur, oxygen, nitrogen, optionally substituted alkylene, optionally substituted aryl, a polymer chain, or a combination thereof. Such an embodiment, where p is p-valent, is disclosed in the following structural analogues of Formulas I and II, namely Formulas VI and VII Formula VI

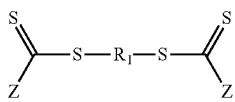

Formula VII

In one embodiment where RAFT polymerization is employed, a RAFT agent, free-radical initiator, mono-vinyl monomer, and a di- or poly-vinyl monomer are combined at the desired molar ratios and dissolved in a solvent of choice. The resulting solution is polymerized to yield a cross-linked, but ungelled polymer with no distinct substrate associating segments. Formula VI below details the structures for the RAFT-based CRP agents that might be used in such an embodiment.

It will be apparent to those skilled in the art that this results in the formation of ζ-clusters that contain primary chains without substrate associative segments.

In one embodiment the hydrophilic primary chains, ζ, may be formed from known hydrophilic monomers, U. Hydrophilic monomers are those which yield a clear single phase when mixed with water at 25° C. at a concentration of 10 wt %. Examples of suitable families of hydrophilic monomers include vinyl amides, vinylimides, vinyl lactams,

| Formula VIII | | |
|---|---|---|
| Dithioates | Trithiocarbonates | Dithiocarbamates & Xanthates |
| 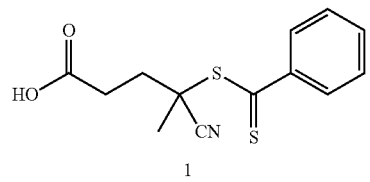 [SMILES: CC(C#N)(CCC(=O)O)SC(=S)c1ccccc1]<br>1 | 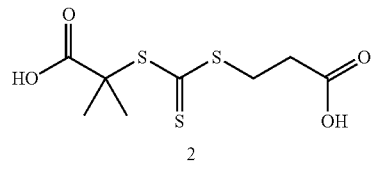<br>2 | 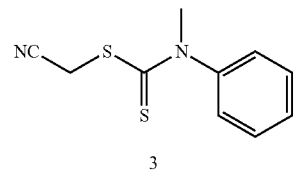<br>3 |
| 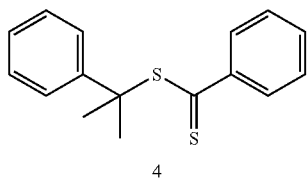 [SMILES: CC(C)(SC(=S)c1ccccc1)c1ccccc1]<br>4 | 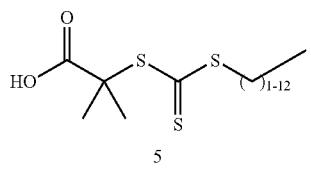<br>5 | 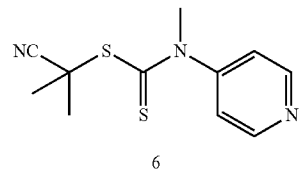 [SMILES: CN(C(=S)SC(C)(C)C#N)c1ccncc1]<br>6 |
| 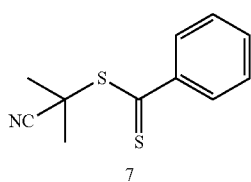<br>7 | 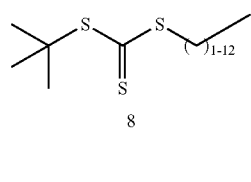<br>8 | 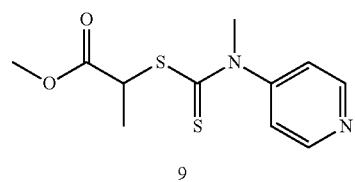 [SMILES: COC(=O)C(C)SC(=S)N(C)c1ccncc1]<br>9 |
| | 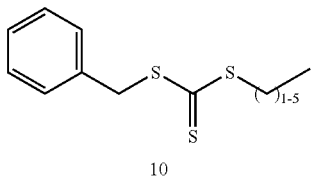<br>10 | 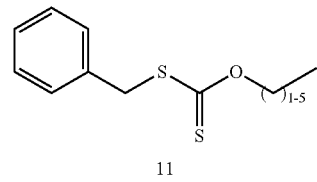<br>11 |
| | 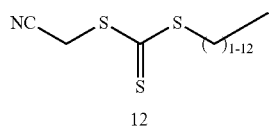<br>12 | |
| | 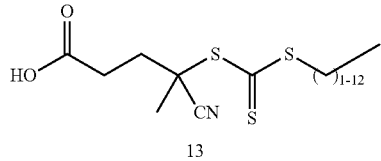<br>13 | | hydrophilic (meth)acrylates, (meth)acrylamides, styrenics, vinyl ethers, vinyl carbonates, vinyl carbamates, vinyl ureas and mixtures thereof.

Examples of suitable hydrophilic monomers include N-vinyl pyrrolidone, N-vinyl-2-piperidone, N-vinyl-2-caprolactam, N-vinyl-3-methyl-2-caprolactam, N-vinyl-3-methyl-2-piperidone, N-vinyl-4-methyl-2-piperidone, N-vinyl-4-methyl-2-caprolactam, N-vinyl-3-ethyl-2-pyrrolidone, N-vinyl-4,5-dimethyl-2-pyrrolidone, vinylimidazole, N—N-dimethylacrylamide, acrylamide, N,N-bis(2-hydroxyethyl)acrylamide, acrylonitrile, N-isopropyl acrylamide, vinyl acetate, (meth)acrylic acid, polyethylene glycol (meth)acrylates, 2-ethyl oxazoline, N-(2-hydroxypropyl) (meth)acrylamide, N-(2-hydroxyethyl) (meth)acrylamide, 2-methacryloyloxyethyl phosphorylcholine, 3-(dimethyl(4-vinylbenzyl)ammonio)propane-1-sulfonate (DMVBAPS), 3-((3-acrylamidopropyl)dimethylammonio)propane-1-sulfonate (AMPDAPS), 3-((3-methacrylamidopropyl)dimethylammonio)propane-1-sulfonate (MAMPDAPS), 3-((3-(acryloyloxy)propyl) dimethyl ammonio)propane-1-sulfonate (APDAPS), methacryloyloxy)propyl)dimethylammonio)propane-1-sulfonate (MAPDAPS), N, N-dimethylaminopropyl(meth) acrylamide, N-vinyl-N-methylacetamide, N-vinylacetamide, N-vinyl-N-methylpropionamide, N-vinyl-N-methyl-2-methylpropionamide, N-vinyl-2-methylpropionamide, N-vinyl-N,N'-dimethylurea, and the like, and mixtures thereof. In one embodiment the hydrophilic monomer comprises N-vinyl pyrrolidone, N-vinyl-N-methylacetamide, 2-methacryloyloxyethyl phosphorylcholine, (meth)acrylic acid, N,N-dimethylacrylamide N-hydroxypropyl methacrylamide, mono-glycerol methacrylate, 2-hydroxyethyl acrylamide, bishydroxyethyl acrylamide, and 2,3-dihydroxypropyl (meth)acrylamide and the like and mixtures thereof. In some embodiments the hydrophilic segment may also comprise charged monomers including but not limited to methacrylic acid, acrylic acid, 3-acrylamidopropionic acid (ACA1), 4-acrylamidobutanoic acid, 5-acrylamidopentanoic acid (ACA2), 3-acrylamido-3-methylbutanoic acid (AMBA), N-vinyloxycarbonyl-α-alanine, N-vinyloxycarbonyl-β-alanine (VINAL), 2-vinyl-4,4-dimethyl-2-oxazolin-5-one (VDMO), reactive sulfonate salts, including, sodium-2-(acrylamido)-2-methylpropane sulphonate (AMPS), 3-sulphopropyl (meth)acrylate potassium salt, 3-sulphopropyl (meth)acrylate sodium salt, bis 3-sulphopropyl itaconate di sodium, bis 3-sulphopropyl itaconate di potassium, vinyl sulphonate sodium salt, vinyl sulphonate salt, styrene sulfonate, sulfoethyl methacrylate, N,N-dimethylaminopropyl acrylamide (DMAPA), 3-acrylamido-N,N,N-trimethylpropan-1-ammonium chloride (i.e. methyl quaternized DMAPA), combinations thereof and the like. In embodiments where the hydrophilic segment comprises at least one charged hydrophilic monomer it may be desirable to include non-charged hydrophilic monomers as comonomers in the hydrophilic segment. In another embodiment the charged hydrophilic monomer is randomly distributed throughout the [Q] segment.

The WSC polymers may be formed via a number of polymerization processes. In one embodiment the WSC polymers are formed using RAFT polymerization. In other embodiments the block copolymers are formed using ATRP. While in another embodiment, the block copolymers are formed using TERP. Still yet, in some embodiments the block copolymers are formed using any known controlled radical polymerization mechanism. In another embodiment the water soluble, crosslinked polymers are formed by conventional free radical polymerization. In one embodiment, the WSC polymers may be formed by conventional free radical polymerization or by other non-controlled mechanisms of polymerization. It is obvious to those of skill in the art, however, that the synthetic utility of such routes is fairly limited (compared to controlled polymerization), i.e. non-controlled polymerizations must be conducted under dilute conditions (with respect to monomer and cross-linker) and typically do not reach high conversion without the formation of a macroscopic gel. In addition, much lower XL:ζ-PC ratios must be targeted to prevent macroscopic gelation. The water soluble, crosslinked polymer does not contain separate terminal substrate associative blocks. Instead, the water soluble, crosslinked polymer contains either a single block, which displays both affinity for the substrate and the desired performance enhancing properties or contains multiple blocks all of which display both affinity for the substrate and the desired performance enhancing properties. The water soluble, cross-linked polymers may also comprise random copolymers. Exemplary embodiments of such water soluble, crosslinked polymer include water soluble crosslinked polymers and copolymers of N-vinyl pyrrolidone, N,N-dimethyl acrylamide, N-hydroxypropyl methacrylamide, mono-glycerol methacrylate, 2-hydroxyethyl acrylamide, and bishydroxyethyl acrylamide,2, 3-dihydroxypropyl (meth)acrylamide. Alternatively two different polymers or copolymers may be crosslinked together to form the copolymers of the present application. In one embodiment of the present application random copolymers are preferred. In another embodiment the water soluble, cross-linked polymers are contacted with ophthalmic devices, such as contact lenses. In this embodiment, it may be desirable for the contact lenses to have low uptake of components, such as preservatives, such as PQ-1, from cleaning and care solutions. In these embodiments the polymers are free from repeating units derived from acrylic acid or substituted acrylic acids, including methacrylic acid.

Embodiments can be used to treat conventional or silicone hydrogel materials, provided the affinity of the water soluble, crosslinked copolymer is tailored to the surface of the lens or device being treated. The water soluble, cross-linked copolymer with appropriate functionality and architecture can closely mimic the behavior of bound mucins found on corneal epithelial surfaces and could be very useful in modifying the surface of a contact lens medical device to improve its lubricity, deposit uptake, and possibly comfort. Without intending to be bound by theory, it is speculated that the cross-linked nature of the water soluble, crosslinked copolymer could closely mimic the mucin-N-mucin interactions that occur through disulfide cross-linking, H-bonding, and molecular entanglement.

Polymerization Conditions

The number average molecular weight of each ζ-primary chain, $M_{n_{\zeta-PC}}$, in a given polymerization produced from contacting a RAFT agent (when required), with at least one hydrophilic monomer, free radical initiator, and cross-linking agent can be targeted using the following equation: where $$M_{n_{\zeta-PC}} = M_{n_M} + M_{n_{XL}} + MW_{CTA} \qquad \text{(equation 1)}$$

$$M_{n_M} = \frac{[M]}{([CTA])} \cdot X \cdot MW_{monomer} \text{ and} \qquad \text{(Equation 2)}$$

$$M_{n_{XL}} = \frac{[XL]}{([CTA])} \cdot \frac{X}{\psi} \cdot MW_{XL} \qquad \text{(Equation 3)}$$

$M_{n_M}$, $M_{n_{XL}}$, and $MW_{CTA}$ represent the individual contributions of molecular weight for the monomer, cross-linker, and RAFT agent that (when summed) are equal to the number average molecular weight of a ζ-primary chain, i.e. $M_{n_{\zeta\text{-}PC}}$. ψ is the number of reactive functional groups on the crosslinker, [M] is the reactive monomer concentration, [XL] is the cross-linker concentration, X is the extent of conversion in fractional form, [CTA] is the concentration of RAFT agent, and $MW_{monomer}$, $MW_{XL}$, and $MW_{CTA}$ are the molecular weights of reactive monomer, cross-linker, RAFT agent, respectively.

The predicted degree of polymerization (DP) for the hydrophilic polymer segment, $DP_{\zeta\text{-}PC}$, can be calculated from Equations 1, 2, and 3. If X is unity (i.e. the polymerization reaches 100% conversion) and $MW_{CTA}$ is neglected because $M_{n_{\zeta\text{-}PC}} \gg MW_{CTA}$, Equation 1 reduces to Equation 4:

$$M_{n_{\zeta\text{-}PC}} = M_{n_M} + M_{n_{XL}} \quad \text{(Equation 4)}$$

$$M_{n_{Q\text{-}Segment}} = M_{n_M} + M_{n_{XL}}$$

Solving the equation in terms of $DP_{\zeta\text{-}chain}$ by dividing $M_{n_M}$ and $M_{n_{XL}}$ by their respective monomeric masses, $MW_M$ and $MW_{XL}$ gives:

$$DP_{n_{Q\text{-}segment}} = \frac{M_{n_M}}{MW_M} + \frac{\frac{M_{n_{XL}}}{MW_{XL}}}{\psi} \quad \text{(Equation 5)}$$

$$= DP_{n_M} + \frac{DP_{n_{XL}}}{\psi}$$

$$DP_{n_{\zeta\text{-}PC}} = \frac{[M]}{([CTA])} + \frac{[XL]}{([CTA])} \cdot \frac{1}{\psi} \quad \text{(Equation 6)}$$

It should be apparent to those of skill in the art that while these equations do predict the number average molecular weight of a ζ-primary chain, $M_{n_{\zeta\text{-}PC}}$, they do not predict the total DP or overall average molecular weight of a ζ-cluster, which are formed due to the participation of the cross-linker in the RAFT polymerization and the fact that ζ-primary chains become randomly cross-linked to each other and to other growing ζ-clusters. The MW of a given ζ-cluster is much higher than that of an individual ζ-primary chain found within that ζ-cluster and may or may not be an exact multiple of the average $M_{n_{\zeta\text{-}PC}}$ for a given polymerization.

One target $DP_{n_{PC}}$ is in the range of about 10 to 10,000, with 50 to 1500 being preferred, 50 to 1000 being more preferred, and 50-500 being most preferred.

Polymerization conditions for the polymerization of the hydrophilic monomer in the presence of the appropriate RAFT agent and cross-linking agent to form the water soluble, crosslinked polymer are selected based upon the initiator system used and to provide the desired balance between chain growth and termination. Other polymerization components, such as solvents, initiator and additives may also be selected such that they have a low transfer constant toward the propagating radical and are fully miscible with all other polymerization components.

The cross-linker may be added to the polymerization solution at the beginning of the reaction or withheld until a later point in the reaction to manipulate the architecture of the resulting nanogel material in a way that gives a desired structure or property. Alternatively, the reactive groups on the cross-linker may be selected such that incorporation into the propagating polymer backbones is less random and thus forms polymeric nanogels that have a less evenly distributed cross-link density. If a polymeric nanogel with more "blocky" incorporation of the cross-linker is desired, a crosslinker with a different reactivity to that of the propagating mono-vinyl monomer may be used. For example, a dimethacrylated cross-linker may be employed in the formation of a nanogel with an acrylamido, mono-vinyl monomer. For some embodiments that exploit CRP, this would result in a "tapered" incorporation of the cross-linker into the primary polymer chain backbone, i.e. one end of each primary polymer chain would be richer in divinyl monomer than the other. Alternatively, for embodiments where a random distribution of the cross-linker throughout the primary polymer chain is desired, the cross-linker may be selected so that both of its reactive sites have similar reactivities (or identical functional groups) to that of the propagating mono-vinyl monomer. In some embodiments, cross-linkers containing functional groups with different reactivities, e.g. 2-(acryloyloxy)ethyl methacrylate or N-(2-acrylamidoethyl)methacrylamide, may be employed. Those skilled in the art would expect such structures to also incorporate across each primary polymer chain in a less-random fashion to that of an analogous system which contains matched reactivities for all reactive functional groups.

In embodiments where the block WSC polymer is made via RAFT, the initiating system is chosen such that under the reaction conditions there is no substantial adverse interaction(s) of the initiator or the initiating radicals with the transfer agent. The initiator should also have the requisite solubility in the reaction medium or monomer mixture. The initiator is selected based upon the hydrophilic monomer selected. For example, where free radical reactive hydrophilic monomers are used, the initiator may be any initiator capable of providing a radical source, such as photoinitiators, thermal initiators, redox initiators and gamma initiators. Suitable photoinitiators include the UV and visible photoinitiators described below. Thermal initiators are chosen to have an appropriate half life at the temperature of polymerization. These initiators can include one or more of the following compounds: 2,2'-azobis(isobutyronitrile), 2,2'-azobis(2-cyano-2-butane), 2,2'-Azobis[2-(2-imidazol-N-2-yl)propane]dihydrochloridedimethyl (VA-044), 2,2'-azobis-dimethylisobutyrate 4,4'-azobis(4-cyanopentanoic acid), 1,1'-azobis(cyclohexanecarbonitrile, 2-(t-butylazo)-2-cyanopropane, 2,2'-azobis[2-methyl-N-(1,1)-bis(hydroxymethyl)-2-hydroxyethyl]propionamide, 2,2'-azobis[2-methyl-N-hydroxyethyl)]-propionamide, 2,2'-azobis(N,N'-dimethyleneisobutyramidine)dihydrochloride, 2,2'-azobis (2-amidinopropane)dihydrochloride, 2,2'-azobis(N,N'-dimethyleneisobutyramine), 2,2'-azobis(2-methyl-N-[1,1-bis(hydroxymethyl)-2-hydroxyethyl]propionamide), 2,2'-azobis(2-methyl-N-[1,1-bis(hydroxymethyl)ethyl] propionamide), 2,2'-azobis[2-methyl-N-(2-hydroxyethyl) propionamide], 2,2'-azobis(isobutyramide)dihydrate, 2,2'-azobis(2,2,4-trimethylpentane), 2,2'-azobis(2-methylpropane), t-butyl peroxyacetate, t-butyl peroxybenzoate, t-butyl peroxyoctoate, t-butyl peroxyneodecanoate, t-butylperoxy isobutyraate, t-amyl peroxypivalate, t-butyl peroxypivalate, di-isopropyl peroxydicarbonate, dicyclohexyl peroxydicarbonate, dicumyl peroxide, dibenzoyl peroxide, dilauroyl peroxide, potassium peroxydisulfate, ammonium peroxydisulfate, di-t-butyl hyponitrite, dicumyl hyponitrite. In one embodiment, the thermal initiator is selected from initiators that generate free radicals at moderately elevated temperatures, such as lauryl peroxide, benzoyl peroxide, isopropyl percarbonate, azobisisobutyronitrile combinations thereof, and the like.

Examples of redox initiators include combinations of the following oxidants and reductants:

oxidants: potassium peroxydisulfate, hydrogen peroxide, t-butyl hydroperoxide.

reductants: iron (II), titanium (III), potassium thiosulfite, potassium bisulfate.

In one embodiment, the initiator is selected from photoinitiators which have the requisite solubility in the reaction medium or monomer mixture and have an appropriate quantum yield for radical production under the conditions of the polymerization. Examples include benzoin derivatives, benzophenone, acyl phosphine oxides, and photo-redox systems. In another embodiment the initiator is selected from visible initiators selected from 1-hydroxycyclohexyl phenyl ketone, 2-hydroxy-2-methyl-1-phenyl-propan-1-one, bis(2, 6-dimethoxybenzoyl)-2,4-4-trimethylpentyl phosphine oxide (DMBAPO), bis(2,4,6-trimethylbenzoyl)-phenyl phosphineoxide (Irgacure 819), 2,4,6-trimethylbenzyldiphenyl phosphine oxide and 2,4,6-trimethylbenzoyl diphenylphosphine oxide, benzoin methyl ester and a combination of camphorquinone and ethyl 4-(N,N-dimethylamino)benzoate, combinations thereof and the like. In another embodiment the initiator comprises at least one phosphine oxide containing photoinitiator, and in another embodiment, bis (2,4,6-trimethylbenzoyl)-phenyl phosphineoxide. When a photoinitiator is used, the reaction mixture is irradiated using radiation in the activating wavelength for the selected photoinitiator.

The polymerization may be conducted in solution, suspension or emulsion, under batch, continuous or feed mode. In one embodiment the process is conducted by adding polymerization agent to the reaction mixture containing the chain transfer agent. Other conditions may be used and are known in the art.

The copolymers provided herein may be purified via known means such as solvent precipitation and/or subsequent solvent extractions or by dialysis or related purification techniques such as, but not limited to tangential flow filtration (TFF).

In some embodiments where RAFT polymerization is used and where the RAFT agent is not removed prior to use, a RAFT polymerization agent is retained at the terminal end of the WSC polymer.

The RAFT polymerization agents are not thermally or hydrolytically stable, and thus it is a benefit of embodiments of the present invention that the RAFT polymerization agents are at the terminal end as they may be readily cleaved or replaced prior to incorporation into the polymer substrates. Alternatively, the RAFT polymerization agent may be left on the WSC polymer and either cleaved during incorporation into the polymer substrate or during use (if the RAFT and/or its degradants are non-toxic, non-irritating). In one embodiment the RAFT polymerization agent is removed prior to incorporating the WSC polymers into the substrates, or the solutions to be contacted with the substrates. Suitable processes for removing the end groups include, but are not limited to reaction with amines, such as disclosed in U.S. Pat. No. 7,109,276, U.S. Pat. No. 6,794,486, U.S. Pat. No. 7,807,755, US2007232783, US2010137548, U.S. Pat. No. 5,385,996, and U.S. Pat. No. 5,874,511. Other end-group removal techniques, such as thermolysis or radical reduction, may be employed in some embodiments as well.

In one embodiment, the WSC polymers have the structure represented in Formula I, above.

In another embodiment, the WSC polymers may be formed using conventional free radical reactions. In this embodiment the block copolymers may be formed by the free radical reaction of at least one hydrophilic monomer and an azo-type macro initiator.

Hydrophobic or Partially Hydrophobic Substrates

The WSC polymers disclosed herein may be non-covalently associated with a variety of hydrophobic, partially hydrophobic, hydrophilic, or amphiphilic substrates, such as polymeric articles formed from polysiloxanes, silicone hydrogels, conventional hydrogels, polymethyl methacrylate, polyethylene, polypropylene, polycarbonate, polyethylene terapthalate, polytetrafluoroethylene, glass, metal and mixtures and copolymers thereof and the like. The association occurs, provided there is sufficient affinity between the functional groups contained within the water soluble, crosslinked copolymer and those found on or within a given substrate. Examples of substrates which may be treated to associate the copolymers of the present invention therewith include polymers and metals used for implantable devices, sutures, graft substrates, punctal plugs, catheters, stents, wound dressings, surgical instruments, ophthalmic devices and the like.

Additional examples of at least partially hydrophobic polymer matrices include highly crosslinked ultra high molecular weight polyethylene (UHMWPE), which is used for implantable devices, such as joint replacements, are made typically has a molecular weight of at least about 400,000, and in some embodiments from about 1,000,000 to about 10,000,000 as defined by a melt index (ASTM D-1238) of essentially 0 and reduced specific gravity of greater than 8 and in some embodiments between about 25 and 30.

Absorbable polymers suitable for use as yarns in making sutures and wound dressings include but are not limited to aliphatic polyesters which include but are not limited to homopolymers and copolymers of lactide (which includes lactic acid d-,l- and meso lactide), glycolide (including glycolic acid), ε-caprolactone, p-dioxanone (1,4-dioxan-2-one), trimethylene carbonate (1,3-dioxan-2-one), alkyl derivatives of trimethylene carbonate, δ-vaterolactone, β-butyrolactone, γ-butyrolactone, ε-decalactone, hydroxybutyrate, hydroxyvalerate, 1,4-dioxepan-2-one (including its dimer 1,5,8,12-tetraoxacyclotetradecane-7,14-dione), 1,5-dioxepan-2-one, 6,6-dimethyl-1,4-dioxan-2-one and polymer blends thereof.

Non-absorbable polymer materials such as but are not limited to, polyamides (polyhexamethylene adipamide (nylon 66), polyhexamethylene sebacamide (nylon 610), polycapramide (nylon 6), polydodecanamide (nylon 12) and polyhexamethylene isophthalamide (nylon 61) copolymers and blends thereof), polyesters (e.g. polyethylene terephthalate, polybutyl terephthalate, copolymers and blends thereof), fluoropolymers (e.g. polytetrafluoroethylene and polyvinylidene fluoride) polyolefins (e.g. polypropylene including isotactic and syndiotactic polypropylene and blends thereof, as well as, blends composed predominately of isotactic or syndiotactic polypropylene blended with heterotactic polypropylene (such as are described in U.S. Pat. No. 4,557,264 issued Dec. 10, 1985 assigned to Ethicon, Inc. hereby incorporated by reference) and polyethylene (such as is described in U.S. Pat. No. 4,557,264 issued Dec. 10, 1985 assigned to Ethicon, Inc. and combinations thereof.

The body of the punctal plugs may be made of any suitable biocompatible polymer including, without limitation, silicone, silicone blends, silicone co-polymers including, for example, hydrophilic monomers of pHEMA (poly-hydroxyethlymethacrylate), polyethylene glycol, polyvinylpyrrolidone, glycerol, and the like. Other suitable biocompatible materials include, for example fluorinated polymers, such as, for example, polytetrafluoroethylene ("PTFE"), polyvinylidene fluoride ("PVDF"), and teflon; polypropylene; polyethylene; nylon; and ethylene vinyl alcohol ("EVA").

Polymeric parts of ultrasonic surgical instruments may be made from polyimides, fluora ethylene propene (FEP Teflon), PTFE Teflon, silicone rubber, EPDM rubber, any of which may be filled with materials such as Teflon or graphite or unfilled. Examples are disclosed in US20050192610 and U.S. Pat. No. 6,458,142. For these embodiments, the WSC polymer may be mixed with a solvent that swells the at least partially hydrophobic polymer matrix and then contacted with the polymer matrix.

In one embodiment, the WSC polymers are associated with preformed articles including silicone ophthalmic devices such as lenses or punctual plugs, silicone hydrogel articles, such as silicone hydrogel lenses. Hydrophilic groups in the water soluble, crosslinked copolymer associate with complementary groups on or in the preformed articles. In this embodiment, the copolymer is dissolved in a solvent which also swells the substrate. The polymer substrate is contacted with a solution comprising the copolymer. When the substrate is a silicone hydrogel article, such as a contact lens, suitable solvents include packing solution, storing solution and cleaning solutions. Using this embodiment as an example, the silicone hydrogel lens is placed in a packing solution comprising the copolymer. The copolymer is present in the solution in amounts between about 0.001 and about 10%, in some embodiments between about 0.005 and about 2% and in other embodiments between about 0.01 and about 0.5 weight %, based upon all components in the solution.

The packing solutions may be any water-based solution that is used for the storage of contact lenses. Typical solutions include, without limitation, saline solutions, other buffered solutions, and deionized water. The preferred aqueous solution is saline solution containing salts including, without limitation, sodium chloride, sodium borate, sodium phosphate, sodium hydrogenphosphate, sodium dihydrogenphosphate, or the corresponding potassium salts of the same. These ingredients are generally combined to form buffered solutions that include an acid and its conjugate base, so that addition of acids and bases cause only a relatively small change in pH. The buffered solutions may also be used to clean or treat contact lenses. When the solutions of the present invention are used for cleaning, treatment or care of contact lenses they may include additional components useful for such solutions, including viscosity adjusting agents, antimicrobial agents, wetting agents, anti-stick agents, preservatives, polyelectrolytes, stabilizers, chelants, antioxidants, combinations thereof and the like. Examples of additional components include 2-(N-morpholino)ethanesulfonic acid (MES), sodium hydroxide, 2,2-bis(hydroxymethyl)-2,2',2"-nitrilotriethanol, n-tris(hydroxymethyl)methyl-2-aminoethanesulfonic acid, citric acid, sodium citrate, sodium carbonate, sodium bicarbonate, acetic acid, sodium acetate, ethylenediamine tetraacetic acid and the like and combinations thereof. Preferably, the solution is a borate buffered or phosphate buffered saline solution.

The WSC polymer may also be associated with the lens using organic solvents (with or without water as a co-solvent). In one embodiment, an organic solvent is used to both swell the medical device, e.g. a contact lens medical device, and dissolve the WSC polymer so that it may be imbibed. Suitable solvents may be selected to swell the medical device, to dissolve the block copolymer or both. In another embodiment the solvents may also be biocompatible so as to simplify manufacturing. The substrate is contacted with the WSC polymer under conditions sufficient to incorporate a lubricious and wetting effective amount of the WSC polymer. As used herein, a lubricious effective amount, is an amount necessary to impart a level of lubricity which may be felt manually (such as by rubbing the device between one's fingers) or when the device is used. Additionally, as used herein, a wetting effective amount is an amount necessary to impart a level of increased wettability to the lens, as determined via known contact angle measurement techniques (i.e. sessile drop, captive bubble, or dynamic contact angle measurements). It has been found that in one embodiment, where the device is a soft contact lens, amounts of WSC polymer as little as 50 ppm provide improved lens "feel" and lowered surface contact angles, as measured by sessile drop. Amounts of WSC polymer greater than about 50 ppm, and more preferably amounts greater than about 100 ppm in the processing packaging, storing or cleaning solution, add a more pronounced improvement in feel. Thus, in this embodiment, the WSC polymer may included in a solution in concentrations up to about 50,000 ppm, in some embodiments between about 10 and 5000 ppm, and in some embodiments between about 10 and about 2000 ppm. In one embodiment the solution comprising the block copolymer is free from visible haze (clear). The packaged lens may be heat treated to increase the amount of WSC polymer which permeates and becomes entangled in the lens. Suitable heat treatments, include, but are not limited to conventional heat sterilization cycles, which include temperatures of about 120° C. for times of about 20 minutes and may be conducted in an autoclave. If heat sterilization is not used, the packaged lens may be separately heat treated. Suitable temperatures for separate heat treatment include at least about 40° C., and preferably between about 50° C. and the boiling point of the solution. Suitable heat treatment times include at least about 10 minutes, and in some embodiments from about 10 to about 30 minutes. It will be appreciated that higher temperatures will require less treatment time.

It is a benefit of the present invention that the step of associating the WSC polymer with the desired substrate may be conducted in a single step without pretreatment, covalent reaction or tie layers. However, in some embodiments it may be desirable to contact the substrate/WSC polymer construct with an additional polymer or nanogel which contain proton receiving groups to form a layered coating. The additional polymer may be linear, branched or crosslinked, and may have associating groups located at an end of the polymer, or throughout the polymer. Each additional polymer comprises groups which are capable of associating or reacting with groups contained in the polymer of the preceding layer. Several alternating layers of WSC and second polymer may be applied. Examples of polymers comprising proton receiving groups include but are not limited to poly-N-vinyl pyrrolidone, poly-N-vinyl-2-piperidone, poly-N-vinyl-2-caprolactam, poly-N-vinyl-3-methyl-2-caprolactam, poly- N-vinyl-3-methyl-2-piperidone, poly-N-vinyl-4-methyl-2-piperidone, poly-N-vinyl-4-methyl-2-caprolactam, poly-N-vinyl-3-ethyl-2-pyrrolidone, and poly-N-vinyl-4,5-dimethyl-2-pyrrolidone, polyvinylimidazole, poly-N—N-dimethylacrylamide, polyvinyl alcohol, polyethylene-oxide, poly-2-ethyl-oxazoline, heparin polysaccharides, polysaccharides, mixtures and copolymers (including block or random, branched, multichain, comb-shaped or star shaped) thereof. Polymers and copolymers of Poly-N-vinylpyrrolidone (PVP) and poly-N—N-dimethylacrylamide may be used.

The second solution may be any of the solutions described above for contacting the substrates with the WSC polymer. The at least one second polymer may be present in the solution in concentrations up to about 50,000 ppm, between about 10 and 5000 ppm, or between about 10 and about 2000 ppm. Because both polymers are non-ionic, the additional treating steps may be done at pH between about 6 and 8 and in some embodiments at about 7.

Many silicone hydrogel materials are known and may be used, including but not limited to senofilcon, galyfilcon, lotrafilcon A and lotrafilcon B, delefilcon, balafilcon, comfilcon, osmofilcon, enfilcon, filcon II, filcon IV and the like. Almost any silicone hydrogel polymer can be treated using the WSC polymers provided herein, including but not limited to those disclosed in U.S. Pat. No. 6,637,929; WO03/022321; WO03/022322; U.S. Pat. No. 5,260,000; U.S. Pat. No. 5,034,461; U.S. Pat. No. 6,867,245; WO2008/061992; U.S. Pat. No. 5,760,100; U.S. Pat. No. 7,553,880; US20100048847; and US2006/0063852.

Similar processes may be used for substrates made from polymers other than silicone hydrogels. The primary change will be in the selection of the solvent, which should solubilize the WSC polymer and either swell the substrate or shrink or compact the WSC polymer. Mixtures of solvents maybe used, and additional components, such as surfactants may be included if desired. For example where the article is a silicone article such as a silicone contact lens or a silicone punctal plug, the WSC polymer may be dissolved in a solvent such as aliphatic alcohols, water and mixtures thereof. Specific examples include isopropanol, n-propanol and the like, at the concentrations described above.

In another embodiment, the WSC polymer may be included in the reaction mixture from which the polymeric article is made. In such an embodiment, effective amounts of WSC polymer might include quantities from about 0.1% to 50% of the total weight of all lens components, with quantities from about 1% to 20% being more preferred, and quantities from about 2% to 15% being most preferred. For example, where the article is a silicone hydrogel contact lens, the WSC polymer may be included, in amounts up to about 20 weight % in the contact lens reaction mixture with one or more silicone-containing components and one or more hydrophilic components. The silicone-containing components and hydrophilic components used to make the polymers disclosed herein can be any of the known components used in the prior art to make silicone hydrogels. These terms, specifically silicone-containing component and hydrophilic component, are not mutually exclusive, in that, the silicone-containing component can be somewhat hydrophilic and the hydrophilic component can comprise some silicone, because the silicone-containing component can have hydrophilic groups and the hydrophilic components can have silicone groups.

One advantage of the copolymers disclosed herein is in embodiments where the WSC polymer is formed by RAFT, the molecular weight (MW) and molecular weight distribution (MWD) may be readily controlled depending on the requirements of manufacture for the chosen article. For example, in one embodiment where the WSC polymer is incorporated into a low viscosity reactive monomer mix, such as those used to form cast molded contact lenses, the MW of the block copolymer may be kept below about 100,000 g/mol. In one embodiment where controlled polymerization is used, the polydispersity of the ζ-primary chains is less than about 1.3. The ζ-cluster will have polydispersity values greater than 1.3. Having lower MW WSC polymer allows addition of a higher concentration of the WSC polymers according to embodiments of the present invention compared to commercially available polymers, such as PVP. Conventional polymers, such as PVP, have higher polydispersities, which can result in extremely viscous monomer mixes that tend to have processing issues due to stringiness.

The use of RAFT to prepare the WSC polymers of the present invention allows for the formation of nano-sized gels without the formation of macroscopically gelled polymer. In addition to this, such nanogels exhibit significantly lowered viscosities, when compared to the same linear polymers with equivalent molecular weights. As mentioned above, high molecular weight polymers with lower viscosities can be desirable for a variety of process applications, including minimizing the viscosity and stringiness of a given reactive monomer mix formulation.

A silicone-containing component is one that contains at least one [—Si—O—] group, in a monomer, macromer or prepolymer. In one embodiment, the Si and attached O are present in the silicone-containing component in an amount greater than 20 weight percent, and in another embodiment greater than 30 weight percent of the total molecular weight of the silicone-containing component. Useful silicone-containing components comprise polymerizable functional groups such as (meth)acrylate, (meth)acrylamide, N-vinyl lactam, N-vinylamide, and styryl functional groups. Examples of silicone-containing components which are useful may be found in U.S. Pat. Nos. 3,808,178; 4,120,570; 4,136,250; 4,153,641; 4,740,533; 5,034,461; 5,760,100; 4,139,513; 5,998,498; US2006/0063852; and U.S. Pat. No. 5,070,215; and EP080539. All of the patents cited herein are hereby incorporated in their entireties by reference. These references disclose many examples of olefinic silicone-containing components.

Suitable silicone-containing components include compounds of the following formula:

Formula IX

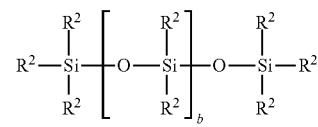

where R² is independently selected from monovalent reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof; and monovalent siloxane chains comprising 1-100 Si—O repeat units which may further comprise functionality selected from alkyl, hydroxy, amino, oxa, carboxy, alkyl carboxy, alkoxy, amido, carbamate, halogen or combinations thereof.

where b=0 to 500, where it is understood that when b is other than 0, b is a distribution having a mode equal to a stated value;

wherein at least one R² comprises a monovalent reactive group, and in some embodiments between one and 3 R² comprise monovalent reactive groups.

As used herein "monovalent reactive groups" are groups that can undergo free radical and/or cationic polymerization. Non-limiting examples of free radical reactive groups include (meth)acrylates, styryls, vinyls, vinyl ethers, substituted or unsubstituted $C_{1-6}$alkyl(meth)acrylates, (meth)acrylamides, $C_{1-6}$alkyl(meth)acrylamides, N-vinyllactams, N-vinylamides, $C_{2-12}$alkenyls, $C_{2-12}$alkenylphenyls, $C_{2-12}$alkenylnaphthyls, $C_{2-6}$alkenylphenyl$C_{1-6}$alkyls, O-vinylcarbamates and O-vinylcarbonates. Suitable substituents on said C1-6 alkyls include ethers, hydroxyls, carboxyls, halogens and combinations thereof. Non-limiting examples of cationic reactive groups include vinyl ethers or epoxide groups and mixtures thereof. In one embodiment the free radical reactive groups comprises (meth)acrylate, acryloxy, (meth)acrylamide, and mixtures thereof.

Suitable monovalent alkyl and aryl groups include unsubstituted monovalent $C_1$ to $C_6$alkyl groups, and in some embodiments $C_1$-$C_4$ alkyl groups, $C_6$-$C_{14}$ aryl groups, such as substituted and unsubstituted methyl, ethyl, propyl, butyl, 2-hydroxypropyl, propoxypropyl, polyethyleneoxypropyl, combinations thereof and the like.

In one embodiment R² is selected from $C_{1-6}$alkyl(meth)acrylates, and $C_{1-6}$alkyl(meth)acrylamides, which may be unsubstituted or substituted with hydroxyl, alkylene ether or a combination thereof. In another embodiment R² is selected from propyl(meth)acrylates and propyl (meth)acrylamides, wherein said propyl may be optionally substituted with hydroxyl, alkylene ether or a combination thereof.

In one embodiment b is zero, one R² is a monovalent reactive group, and at least 3 R¹ are selected from monovalent alkyl groups having one to 16 carbon atoms, and in another embodiment from monovalent alkyl groups having one to 6 carbon atoms. Non-limiting examples of silicone components of this embodiment include 2-methyl-,2-hydroxy-3-[3-[1,3,3,3-tetramethyl-1-[(trimethylsilyl)oxy]disiloxanyl]propoxy]propyl ester ("SiGMA"), 2-hydroxy-3-methacryloxypropyloxypropyl-tris(trimethylsiloxy)silane, 3-methacryloxypropyltris(trimethylsiloxy)silane ("TRIS"), 3-methacryloxypropylbis(trimethylsiloxy)methyl silane and 3-methacryloxypropylpentamethyldisiloxane.

In another embodiment, b is 2 to 20, 3 to 15 or in some embodiments 3 to 10; at least one terminal R² comprises a monovalent reactive group and the remaining R² are selected from monovalent alkyl groups having 1 to 16 carbon atoms, and in another embodiment from monovalent alkyl groups having 1 to 6 carbon atoms. In yet another embodiment, b is 3 to 15, one terminal R² comprises a monovalent reactive group selected from substituted or unsubstituted $C_{1-6}$alkyl (meth)acrylates, substituted or unsubstituted $C_{1-6}$alkyl (meth)acrylamides, the other terminal R² comprises a monovalent alkyl group having 1 to 6 carbon atoms and the remaining R² comprise monovalent alkyl group having 1 to 3 carbon atoms. Non-limiting examples of silicone components of this embodiment include (mono-(2-hydroxy-3-methacryloxypropyl)-propyl ether terminated polydimethylsiloxane (400-1000 MW)) ("OH-mPDMS"), monomethacryloxypropyl terminated mono-n-butyl terminated polydimethylsiloxanes (800-1000 MW), ("mPDMS"), N-(2,3-dihydroxypropane)-N'-(propyl tetra(dimethylsiloxy) dimethylbutylsilane)acrylamide methacryamide silicones of the following formulae (s1) through (s6);

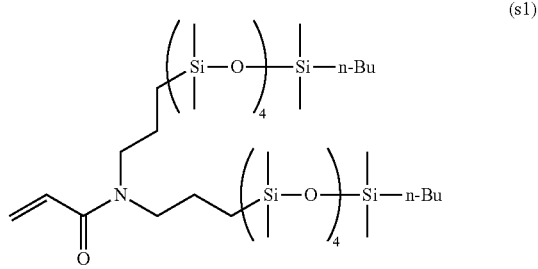

(s1)

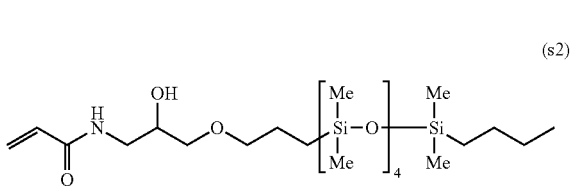

(s2)

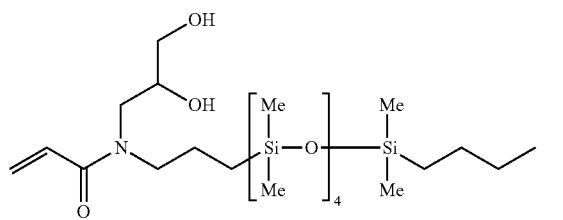

(s3)

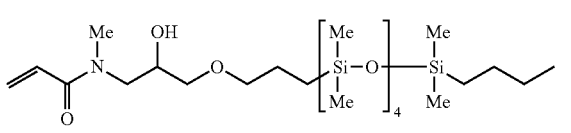

(s4)

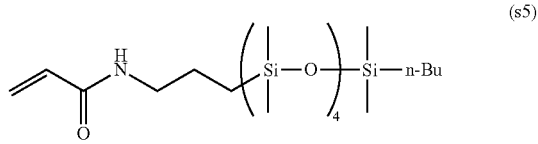

(s5)

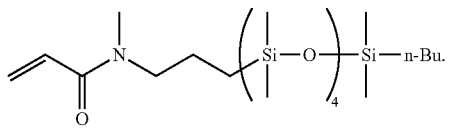 (s6)

In another embodiment b is 5 to 400 or from 10 to 300, both terminal $R^1$ comprise monovalent reactive groups and the remaining $R^2$ are independently selected from monovalent alkyl groups having 1 to 18 carbon atoms which may have ether linkages between carbon atoms and may further comprise halogen.

In another embodiment, one to four $R^2$ comprises a vinyl carbonate or carbamate of the formula:

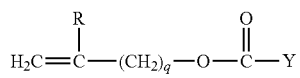 Formula X wherein: Y denotes O—, S— or NH—;
R denotes hydrogen or methyl; and q is 0 or 1.

The silicone-containing vinyl carbonate or vinyl carbamate monomers specifically include: 1,3-bis[4-(vinyloxycarbonyloxy)but-1-yl]tetramethyl-disiloxane; 3-(vinyloxycarbonylthio) propyl-[tris(trimethylsiloxy)silane]; 3-[tris (trimethyl siloxy)silyl]propyl allyl carbamate; 3-[tris (trimethylsiloxy)silyl]propyl vinyl carbamate; trimethylsilylethyl vinyl carbonate; trimethylsilylmethyl vinyl carbonate, and Formula XI

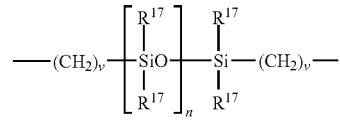

Where biomedical devices with modulus below about 200 are desired, only one $R^2$ shall comprise a monovalent reactive group and no more than two of the remaining $R^2$ groups will comprise monovalent siloxane groups.

In one embodiment, where a silicone hydrogel lens is desired, the lens will be made from a reaction mixture comprising at least about 20 weight % and in some embodiments between about 20 and 70% wt silicone-containing components based on total weight of reactive monomer components from which the polymer is made.

Another class of silicone-containing components includes polyurethane macromers of the following formulae:

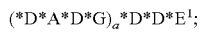

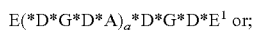

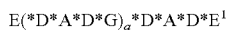 Formulae XII-XIV wherein:
D denotes an alkyl diradical, an alkyl cycloalkyl diradical, a cycloalkyl diradical, an aryl diradical or an alkylaryl diradical having 6 to 30 carbon atoms,
G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;
* denotes a urethane or ureido linkage;
a is at least 1;
A denotes a divalent polymeric radical of Formula:

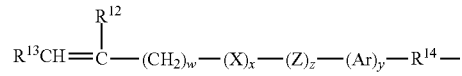 Formula XV $R^{17}$ independently denotes an alkyl or fluoro-substituted alkyl group having 1 to 10 carbon atoms which may contain ether linkages between carbon atoms; v is at least 1; and n provides a moiety weight of 400 to 10,000; each of E and $E^1$ independently denotes a polymerizable unsaturated organic radical represented by formula:

Formula XVI $$R^{13}CH=\overset{R^{12}}{\underset{}{C}}-(CH_2)_w-(X)_x-(Z)_z-(Ar)_y-R^{14}-$$

wherein: $R^{12}$ is hydrogen or methyl; $R^{13}$ is hydrogen, an alkyl radical having 1 to 6 carbon atoms, or a —CO—Y—$R^{11}$ radical wherein Y is —O—, —S— or —NH—; $R^{11}$ is a $C_{1-6}$ monovalent alkyl, and in some embodiments an unsubstituted $C_{1-3}$ alkyl; $R^{14}$ is a divalent radical having 1 to 12 carbon atoms; X denotes —CO— or —OCO—; Z denotes —O— or —NH—; Ar denotes an aromatic radical having 6 to 30 carbon atoms; w is 0 to 6; x is 0 or 1; y is 0 or 1; and z is 0 or 1.

In one embodiment the silicone-containing component comprises a polyurethane macromer represented by the following formula:

Formula XVII

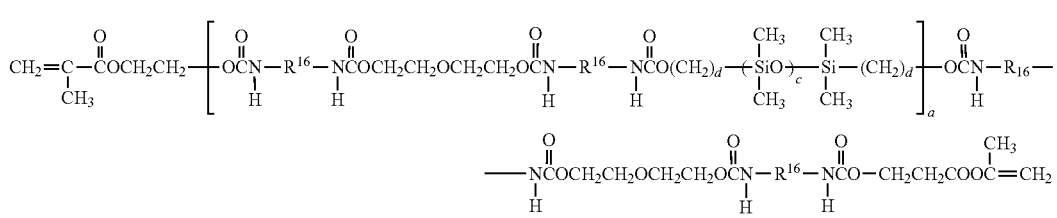

wherein $R^{16}$ is a diradical of a diisocyanate after removal of the isocyanate group, such as the diradical of isophorone diisocyanate; a is 1-5, d is 3-4 and c is 10-200 or 10-100. Another suitable silicone containing macromer is compound of formula XVIII (in which f+g is a number in the range of 10 to 30 and h is a number in the range of 20-30, 22-26 or 25) formed by the reaction of fluoroether, hydroxy-terminated polydimethylsiloxane, isophorone diisocyanate and isocyanatoethylmethacrylate.

hydrophilic components include hydrophilic monomers, prepolymers and polymers and may be present in amounts between about 10 to about 60 weight % based upon the weight of all reactive components, in some embodiments about 15 to about 50 weight %, and in other embodiments between about 20 to about 40 weight %. The hydrophilic monomers that may be used to make the polymers have at least one polymerizable double bond and at least one hydrophilic functional group. Examples of polymerizable double Formula XVIII

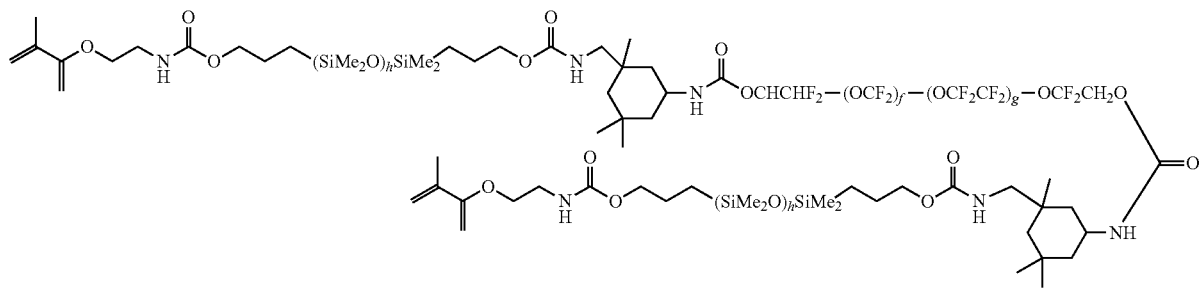

Other silicone-containing components suitable for use include those described is WO 96/31792 such as macromers containing polysiloxane, polyalkylene ether, diisocyanate, polyfluorinated hydrocarbon, polyfluorinated ether and polysaccharide groups. Another class of suitable silicone-containing components includes silicone containing macromers made via GTP, such as those disclosed in U.S. Pat. Nos. 5,314,960; 5,331,067; 5,244,981; 5,371,147; and 6,367,929. U.S. Pat. Nos. 5,321,108; 5,387,662; and 5,539,016 describe polysiloxanes with a polar fluorinated graft or side group having a hydrogen atom attached to a terminal difluoro-substituted carbon atom. US 2002/0016383 describes hydrophilic siloxanyl methacrylates containing ether and siloxanyl linkages and crosslinkable monomers containing polyether and polysiloxanyl groups. Any of the foregoing polysiloxanes can also be used as the silicone-containing component.

In one embodiment of the present invention where a modulus of less than about 120 psi is desired, the majority of the mass fraction of the silicone-containing components used in the lens formulation should contain only one polymerizable functional group ("monofunctional silicone containing component"). In this embodiment, to insure the desired balance of oxygen transmissibility and modulus it is preferred that all components having more than one polymerizable functional group ("multifunctional components") make up no more than 10 mmol/100 g of the reactive components, and preferably no more than 7 mmol/100 g of the reactive components.

In another embodiment, the reaction mixtures are substantially free of silicone containing components which contain trimethylsiloxy groups.

The silicone containing components may be present in amounts up to about 85 weight %, and in some embodiments between about 10 and about 80 and in other embodiments between about 20 and about 70 weight %, based upon all reactive components.

Hydrophilic components include those which are capable of providing at least about 20% and in some embodiments at least about 25% water content to the resulting lens when combined with the remaining reactive components. Suitable bonds include acrylic, methacrylic, acrylamido, methacrylamido, fumaric, maleic, styryl, isopropenylphenyl, O-vinylcarbonate, O-vinylcarbamate, allylic, O-vinylacetyl and N-vinyllactam and N-vinylamido double bonds. Such hydrophilic monomers may themselves be used as cross-linking agents. "Acrylic-type" or "acrylic-containing" monomers are those monomers containing the acrylic group

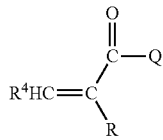

wherein R is H or $CH_3$, $R^4$ is H, $C_{1-3}$ unsubstituted alkyl or carbonyl, and Q is O or N, which are also known to polymerize readily, such as N,N-dimethylacrylamide (DMA), 2-hydroxyethyl (meth)acrylate, glycerol methacrylate, 2-hydroxyethyl methacrylamide, polyethyleneglycol monomethacrylate, methacrylic acid, acrylic acid, mixtures thereof and the like.

Hydrophilic vinyl-containing monomers which may be incorporated into the hydrogels include monomers such as N-vinyl lactams (e.g. N-vinyl pyrrolidone (NVP)), N-vinyl-2-piperidone, N-vinyl-2-caprolactam, N-vinyl-3-methyl-2-caprolactam, N-vinyl-3-methyl-2-piperidone, N-vinyl-4-methyl-2-piperidone, N-vinyl-4-methyl-2-caprolactam, N-vinyl-3-ethyl-2-pyrrolidone, N-vinyl-4,5-dimethyl-2-pyrrolidone); N-vinyl-N-methyl acetamide, N-vinyl-N-ethyl acetamide, N-vinyl-N-ethyl formamide, N-vinyl formamide, N-2-hydroxyethyl vinyl carbamate, N-carboxy-β-alanine N-vinyl ester, vinylimidazole, with NVP being preferred in one embodiment.

Additional hydrophilic monomers which may be used include acrylamide, N,N-bis(2-hydroxyethyl)acrylamide, acrylonitrile, N-isopropyl acrylamide, vinyl acetate, (meth) acrylic acid, polyethylene glycol (meth)acrylates, 2-ethyl oxazoline, N-(2-hydroxypropyl) (meth)acrylamide, N-(2-hydroxyethyl) (meth)acrylamide, 2-methacryloyloxyethyl phosphorylcholine, 3-(dimethyl(4-vinylbenzyl)ammonio)

propane-1-sulfonate (DMVBAPS), 3-((3-acrylamidopropyl) dimethylammonio)propane-1-sulfonate (AMPDAPS), 3-((3-methacrylamidopropyl)dimethylammonio)propane-1-sulfonate (MAMPDAPS), 3-((3-(acryloyloxy)propyl)dimethylammonio)propane-1-sulfonate (APDAPS), methacryloyloxy)propyl)dimethylammonio)propane-1-sulfonate (MAPDAPS), N-vinyl-N-methylacetamide, N-vinylacetamide, N-vinyl-N-methylpropionamide, N-vinyl-N-methyl-2-methylpropionamide, N-vinyl-2-methylpropionamide, N-vinyl-N,N'-dimethylurea, and the like, and mixtures thereof. In one embodiment suitable hydrophilic monomers comprise N-vinyl pyrrolidone, N-vinyl-N-methylacetamide, 2-methacryloyloxyethyl phosphorylcholine, (meth)acrylic acid, N,N-dimethylacrylamide, N-hydroxypropyl methacrylamide, mono-glycerol methacrylate, 2-hydroxyethyl acrylamide, bishydroxyethyl acrylamide, and 2,3-dihydroxypropyl (meth)acrylamide and the like and mixtures thereof.

In some embodiments the hydrophilic monomers may also comprise charged monomers including but not limited to methacrylic acid, acrylic acid, 3-acrylamidopropionic acid (ACA1), 4-acrylamidobutanoic acid, 5-acrylamidopentanoic acid (ACA2), 3-acrylamido-3-methylbutanoic acid (AMBA), N-vinyloxycarbonyl-α-alanine, N-vinyloxycarbonyl-β-alanine (VINAL), 2-vinyl-4,4-dimethyl-2-oxazolin-5-one (VDMO), reactive sulfonate salts, including, sodium-2-(acrylamido)-2-methylpropane sulphonate (AMPS), 3-sulphopropyl (meth)acrylate potassium salt, 3-sulphopropyl (meth)acrylate sodium salt, bis 3-sulphopropyl itaconate di sodium, bis 3-sulphopropyl itaconate di potassium, vinyl sulphonate sodium salt, vinyl sulphonate salt, styrene sulfonate, sulfoethyl methacrylate, combinations thereof and the like.

Other hydrophilic monomers that can be employed include polyoxyethylene polyols having one or more of the terminal hydroxyl groups replaced with a functional group containing a polymerizable double bond. Examples include polyethylene glycol with one or more of the terminal hydroxyl groups replaced with a functional group containing a polymerizable double bond. Examples include polyethylene glycol reacted with one or more molar equivalents of an end-capping group such as isocyanatoethyl methacrylate ("IEM"), methacrylic anhydride, methacryloyl chloride, vinylbenzoyl chloride, or the like, to produce a polyethylene polyol having one or more terminal polymerizable olefinic groups bonded to the polyethylene polyol through linking moieties such as carbamate or ester groups.

Still further examples are the hydrophilic vinyl carbonate or vinyl carbamate monomers disclosed in U.S. Pat. No. 5,070,215, and the hydrophilic oxazolone monomers disclosed in U.S. Pat. No. 4,190,277. Other suitable hydrophilic monomers will be apparent to one skilled in the art.

In one embodiment the hydrophilic monomers which may be incorporated into the polymers disclosed herein include hydrophilic monomers such as N,N-dimethyl acrylamide (DMA), 2-hydroxyethyl acrylate, glycerol methacrylate, 2-hydroxyethyl methacrylamide, N-vinylpyrrolidone (NVP), N-vinyl methacrylamide, HEMA, and polyethyleneglycol monomethacrylate.

In another embodiment the hydrophilic monomers include DMA, NVP, HEMA and mixtures thereof.

The reactive mixtures used to form substrates such as contact lenses may also comprise as hydrophilic components one or more polymeric wetting agents. The polymeric wetting agents may comprise one or more of the water soluble, crosslinked polymers disclosed herein, previously disclosed wetting agents or a combination thereof. As used herein, such polymeric wetting agents used in reaction mixtures refers to substances having a weight average molecular weight of no less than about 5,000 Daltons, wherein said substances upon incorporation to silicone hydrogel formulations, increase the wettability of the cured silicone hydrogels. In one embodiment the weight average molecular weight of these polymeric wetting agents is greater than about 30,000; in another between about 150,000 to about 2,000,000 Daltons, in yet another between about 300,000 to about 1,800,000 Daltons, and in yet another about 500,000 to about 1,500,000 Daltons.

Alternatively, the molecular weight of polymeric wetting agents can be also expressed by the K-value, based on kinematic viscosity measurements, as described in Encyclopedia of Polymer Science and Engineering, N-Vinyl Amide Polymers, Second edition, Vol. 17, pgs. 198-257, John Wiley & Sons Inc. When expressed in this manner, hydrophilic monomers having K-values of greater than about 46 and in one embodiment between about 46 and about 150. Suitable amounts of polymeric wetting agents in reaction mixtures include from about 1 to about 20 weight percent, in some embodiments about 5 to about 20 percent, in other embodiments about 6 to about 17 percent, all based upon the total of all reactive components.

Examples of polymeric wetting agents include but are not limited to polyamides, polylactones, polyimides, polylactams and functionalized polyamides, polylactones, polyimides, polylactams, such as DMA functionalized by copolymerizing DMA with a lesser molar amount of a hydroxyl-functional monomer such as HEMA, and then reacting the hydroxyl groups of the resulting copolymer with materials containing radical polymerizable groups, such as isocyanatoethylmethacrylate or methacryloyl chloride. Polymeric wetting agents made from DMA or N-vinyl pyrrolidone with glycidyl methacrylate may also be used. The glycidyl methacrylate ring can be opened to give a diol which may be used in conjunction with other hydrophilic prepolymer in a mixed system to increase the compatibility of the component in the reactive mixture. In one embodiment the polymeric wetting agents contain at least one cyclic moiety in their backbone, such as but not limited to, a cyclic amide or cyclic imide. Polymeric wetting agents include but are not limited to poly-N-vinyl pyrrolidone, poly-N-vinyl-2-piperidone, poly-N-vinyl-2-caprolactam, poly-N-vinyl-3-methyl-2-caprolactam, poly-N-vinyl-3-methyl-2-piperidone, poly-N-vinyl-4-methyl-2-piperidone, poly-N-vinyl-4-methyl-2-caprolactam, poly-N-vinyl-3-ethyl-2-pyrrolidone, and poly-N-vinyl-4,5-dimethyl-2-pyrrolidone, polyvinylimidazole, poly-N—N-dimethylacrylamide, polyvinyl alcohol, polyacrylic acid, polyethylene-oxide, poly-2-ethyl-oxazoline, heparin polysaccharides, polysaccharides, mixtures and copolymers (including block or random, branched, multichain, comb-shaped or star shaped) thereof, where poly-N-vinylpyrrolidone (PVP) is particularly preferred in one embodiment. Copolymers might also be used such as graft copolymers of PVP.

The polymeric wetting agents used in reaction mixtures also provide improved wettability, and particularly improved in vivo wettability to the medical devices. Without being bound by any theory, it is believed that the polymeric wetting agents are hydrogen bond receivers which in aqueous environments, hydrogen bond to water, thus becoming effectively more hydrophilic. The absence of water facilitates the incorporation of the polymeric wetting agents in the reaction mixture. Aside from the specifically named polymeric wetting agents, it is expected that any polymer will be useful provided that when said polymer is added to a formulation, the polymer (a) does not substantially phase separate from the reaction mixture and (b) imparts wettability to the resulting cured polymer network. In some embodiments it is preferred that the polymeric wetting agents be soluble in the diluent at reaction temperatures.

Compatibilizing agents may also be used. In some embodiments the compatibilizing component may be any functionalized silicone containing monomer, macromer or prepolymer which, when polymerized and/or formed into a final article is compatible with the selected hydrophilic components. The compatibility test disclosed in WO03/022321 may be used to select suitable compatibilizing agents. In some embodiments, a silicone monomer, prepolymer or macromer which also comprises hydroxyl groups is included in the reaction mixture. Examples include 3-methacryloxy-2-hydroxypropyloxy)propylbis(trimethylsiloxy) methylsilane, mono-(3-methacryloxy-2-hydroxypropyloxy) propyl terminated, mono-butyl terminated polydimethylsiloxane (MW 1100), hydroxyl functionalized silicone containing GTP macromers, hydroxyl functionalized macromers comprising polydimethyl siloxanes, combinations thereof and the like. In another embodiment, the polymeric wettings may be used as compatibilizing components.

The hydroxyl containing component may also act as a cross-linking agent during the formation of substrates such as contact lenses.

With respect to making substrates such as contact lenses, it is generally necessary to add one or more cross-linking agents, also referred to as cross-linking monomers, to the reaction mixture, such as ethylene glycol dimethacrylate ("EGDMA"), trimethylolpropane trimethacrylate ("TMPTMA"), glycerol trimethacrylate, polyethylene glycol dimethacrylate (wherein the polyethylene glycol preferably has a molecular weight up to, e.g., about 5000), and other poly(meth)acrylate esters, such as the end-capped polyoxyethylene polyols described above containing two or more terminal methacrylate moieties. The cross-linking agents are used in the usual amounts, e.g., from about 0.000415 to about 0.0156 mole per 100 grams of reactive components in the reaction mixture. Alternatively, if the hydrophilic monomers and/or the silicone containing monomers act as the cross-linking agent, the addition of a cross-linking agent to the reaction mixture is optional. Examples of hydrophilic monomers which can act as the crosslinking agent and when present do not require the addition of an additional crosslinking agent to the reaction mixture include polyoxyethylene polyols described above containing two or more terminal methacrylate moieties.

An example of a silicone containing monomer which can act as a crosslinking agent and, when present, does not require the addition of a crosslinking monomer to the reaction mixture includes $\alpha,\omega$-bismethacryloypropyl polydimethylsiloxane.

The reaction mixture may contain additional components such as, but not limited to, UV absorbers, photochromic compounds, pharmaceutical and nutriceutical compounds, antimicrobial compounds, reactive tints, pigments, copolymerizable and non-polymerizable dyes, release agents and combinations thereof.

Generally the reactive components are mixed in a diluent to form a reaction mixture. Suitable diluents are known in the art. For silicone hydrogels suitable diluents are disclosed in WO 03/022321, U.S. Pat. No. 6,020,445 the disclosure of which is incorporated herein by reference.

Classes of suitable diluents for silicone hydrogel reaction mixtures include alcohols having 2 to 20 carbons, amides having 10 to 20 carbon atoms derived from primary amines and carboxylic acids having 8 to 20 carbon atoms. In some embodiments primary and tertiary alcohols are preferred. Preferred classes include alcohols having 5 to 20 carbons and carboxylic acids having 10 to 20 carbon atoms.

Specific diluents which may be used include 1-ethoxy-2-propanol, diisopropylaminoethanol, isopropanol, 3,7-dimethyl-3-octanol, 1-decanol, 1-dodecanol, 1-octanol, 1-pentanol, 2-pentanol, 1-hexanol, 2-hexanol, 2-octanol, 3-methyl-3-pentanol, tert-amyl alcohol, tert-butanol, 2-butanol, 1-butanol, 2-methyl-2-pentanol, 2-propanol, 1-propanol, ethanol, 2-ethyl-1-butanol, (3-acetoxy-2-hydroxypropyloxy)propylbis(trimethyl siloxy)methylsilane, 1-tert-butoxy-2-propanol, 3,3-dimethyl-2-butanol, tert-butoxyethanol, 2-octyl-1-dodecanol, decanoic acid, octanoic acid, dodecanoic acid, 2-(diisopropylamino)ethanol mixtures thereof and the like.

Preferred diluents include 3,7-dimethyl-3-octanol, 1-dodecanol, 1-decanol, 1-octanol, 1-pentanol, 1-hexanol, 2-hexanol, 2-octanol, 3-methyl-3-pentanol, 2-pentanol, t-amyl alcohol, tert-butanol, 2-butanol, 1-butanol, 2-methyl-2-pentanol, 2-ethyl-1-butanol, ethanol, 3,3-dimethyl-2-butanol, 2-octyl-1-dodecanol, decanoic acid, octanoic acid, dodecanoic acid, mixtures thereof and the like.

More preferred diluents include 3,7-dimethyl-3-octanol, 1-dodecanol, 1-decanol, 1-octanol, 1-pentanol, 1-hexanol, 2-hexanol, 2-octanol, 1-dodecanol, 3-methyl-3-pentanol, 1-pentanol, 2-pentanol, t-amyl alcohol, tert-butanol, 2-butanol, 1-butanol, 2-methyl-2-pentanol, 2-ethyl-1-butanol, 3,3-dimethyl-2-butanol, 2-octyl-1-dodecanol, mixtures thereof and the like.

Suitable diluents for non-silicone containing reaction mixtures include glycerin, ethylene glycol, ethanol, methanol, ethyl acetate, methylene chloride, polyethylene glycol, polypropylene glycol, low molecular weight PVP, such as disclosed in U.S. Pat. No. 4,018,853, U.S. Pat. No. 4,680,336 and U.S. Pat. No. 5,039,459, including, but not limited to boric acid esters of dihydric alcohols, combinations thereof and the like.

Mixtures of diluents may be used. The diluents may be used in amounts up to about 55% by weight of the total of all components in the reaction mixture. More preferably the diluent is used in amounts less than about 45% and more preferably in amounts between about 15 and about 40% by weight of the total of all components in the reaction mixture.

A polymerization initiator is preferably included in the reaction mixture used to form substrates such as contact lenses. The polymerization initiators includes compounds such as lauryl peroxide, benzoyl peroxide, isopropyl percarbonate, azobisisobutyronitrile, and the like, that generate free radicals at moderately elevated temperatures, and photoinitiator systems such as aromatic alpha-hydroxy ketones, alkoxyoxybenzoins, acetophenones, acylphosphine oxides, bisacylphosphine oxides, and a tertiary amine plus a diketone, mixtures thereof and the like. Illustrative examples of photoinitiators are 1-hydroxycyclohexyl phenyl ketone, 2-hydroxy-2-methyl-1-phenyl-propan-1-one, bis(2,6-dimethoxybenzoyl)-2,4-4-trimethylpentyl phosphine oxide (DMBAPO), bis(2,4,6-trimethylbenzoyl)-phenyl phosphineoxide (Irgacure 819), 2,4,6-trimethylbenzyldiphenyl phosphine oxide and 2,4,6-trimethylbenzoyl diphenylphosphine oxide, benzoin methyl ester and a combination of camphorquinone and ethyl 4-(N,N-dimethylamino)benzoate. Commercially available visible light initiator systems include Irgacure 819, Irgacure 1700, Irgacure 1800, Irgacure 819, Irgacure 1850 (all from Ciba Specialty Chemicals) and Lucirin TPO initiator (available from BASF). Commercially available UV photoinitiators include Darocur 1173 and Darocur 2959 (Ciba Specialty Chemicals). These and other photoinitiators which may be used are disclosed in Volume III, Photoinitiators for Free Radical Cationic & Anionic Photopolymerization, 2nd Edition by J. V. Crivello & K. Dietliker; edited by G. Bradley; John Wiley and Sons; New York; 1998, which is incorporated herein by reference. The initiator is used in the reaction mixture in effective amounts to initiate photopolymerization of the reaction mixture, e.g., from about 0.1 to about 2 parts by weight per 100 parts of reactive monomer. Polymerization of the reaction mixture can be initiated using the appropriate choice of heat or visible or ultraviolet light or other means depending on the polymerization initiator used. Alternatively, initiation can be conducted without a photoinitiator using, for example, e-beam. However, when a photoinitiator is used, the preferred initiators are bisacylphosphine oxides, such as bis(2, 4,6-trimethylbenzoyl)-phenyl phosphine oxide (Irgacure 819®) or a combination of 1-hydroxycyclohexyl phenyl ketone and bis(2,6-dimethoxybenzoyl)-2,4-4-trimethylpentyl phosphine oxide (DMBAPO), and the preferred method of polymerization initiation is visible light. The most preferred is bis(2,4,6-trimethylbenzoyl)-phenyl phosphine oxide (Irgacure 819®).

The preferred range of silicone-containing monomer present in the reaction mixture is from about 5 to 95 weight percent, more preferably about 30 to 85 weight percent, and most preferably about 45 to 75 weight percent of the reactive components in the reaction mixture. The preferred range of hydrophilic monomer present is from about 5 to 80 weight percent, more preferably about 10 to 60 weight percent, and most preferably about 20 to 50 weight percent of the reactive components in the reaction mixture. The preferred range of diluent present is from about 2 to 70 weight percent, more preferably about 5 to 50 weight percent, and most preferably about 15 to 40 weight percent of the total reaction mixture (including reactive and nonreactive components).

The reaction mixtures can be formed by any of the methods known to those skilled in the art, such as shaking or stirring, and used to form polymeric articles or devices by known methods.

For example, the biomedical devices may be prepared by mixing reactive components and the diluent(s) with a polymerization initiator and curing by appropriate conditions to form a product that can be subsequently formed into the appropriate shape by lathing, cutting and the like. Alternatively, the reaction mixture may be placed in a mold and subsequently cured into the appropriate article.

Various processes are known for processing the reaction mixture in the production of contact lenses, including spincasting and static casting. Spincasting methods are disclosed in U.S. Pat. Nos. 3,408,429 and 3,660,545; and static casting methods are disclosed in U.S. Pat. Nos. 4,113,224 and 4,197,266. The preferred method for producing contact lenses is by the molding of the silicone hydrogels, which is economical, and enables precise control over the final shape of the hydrated lens. For this method, the reaction mixture is placed in a mold having the shape of the final desired silicone hydrogel, i.e., water-swollen polymer, and the reaction mixture is subjected to conditions whereby the monomers polymerize, to thereby produce a polymer/diluent mixture in the shape of the final desired product. Then, this polymer/diluent mixture is treated with a solvent to remove the diluent and ultimately replace it with water, producing a silicone hydrogel having a final size and shape which are quite similar to the size and shape of the original molded polymer/diluent article. This method can be used to form contact lenses and is further described in U.S. Pat. Nos. 4,495,313; 4,680,336; 4,889,664; and 5,039,459, incorporated herein by reference.

Biomedical devices, and particularly ophthalmic lenses, have a balance of properties which makes them particularly useful. Such properties include clarity, water content, oxygen permeability and contact angle. The incorporation of at least one WSC polymer according to embodiments of the present invention provides articles having very desirable wettability/contact angles with solutions and improved biometric performance as evidenced by reduced lipocalin, lipid and mucin uptake levels. Silicone hydrogel contact lenses incorporating the WSC polymers will display contact angles of less than about 60° and in some embodiments less than about 40°, and decreases in contact angle of 40% and in some embodiments 50% or more. Lipid uptake can be lowered by 50% or more and silicone hydrogel lenses having about 12 µg, 10 µg, or even 5 µg or less may be produced. In one embodiment, the biomedical devices are contact lenses having a water content of greater than about 17%, preferably greater than about 20% and more preferably greater than about 25%.

Suitable oxygen permeabilities for silicone containing lenses are preferably greater than about 40 barrer and more preferably greater than about 60 barrer.

In some embodiments the articles of the present invention have combinations of the above described oxygen permeability, water content and contact angle. All combinations of the above ranges are deemed to be within the present invention.

The non-limiting examples below further describe this invention.

Wettability of lenses can be determined using a sessile drop technique measured using KRUSS DSA-100™ instrument at room temperature and using DI water as probe solution. The lenses to be tested (3-5/sample) were rinsed in DI water to remove carry over from packing solution. Each test lens was placed on blotting lint free wipes which were dampened with packing solution. Both sides of the lens were contacted with the wipe to remove surface water without drying the lens. To ensure proper flattening, lenses were placed "bowl side down" on the convex surface on contact lens plastic moulds. The plastic mould and the lens were placed in the sessile drop instrument holder, ensuring proper central syringe alignment and that the syringe corresponds to the assigned liquid. A 3 to 4 microliter of DI water drop was formed on the syringe tip using DSA 100-Drop Shape Analysis software ensuring the liquid drop was hanging away from the lens. The drop was released smoothly on the lens surface by moving the needle down. The needle was withdrawn away immediately after dispensing the drop. The liquid drop was allowed to equilibrate on the lens for 5 to 10 seconds and the contact angle was computed based on the contact angle measured between the drop image and the lens surface.

The water content may be measured as follows: lenses to be tested were allowed to sit in packing solution for 24 hours. Each of three test lens were removed from packing solution using a sponge tipped swab and placed on blotting wipes which have been dampened with packing solution. Both sides of the lens were contacted with the wipe. Using tweezers, the test lens were placed in a weighing pan and weighed. The two more sets of samples were prepared and weighed as above. The pan was weighed three times and the average is the wet weight.

The dry weight was measured by placing the sample pans in a vacuum oven which has been preheated to 60° C. for 30 minutes. Vacuum was applied until at least 0.4 inches Hg is attained. The vacuum valve and pump were turned off and the lenses were dried for four hours. The purge valve was opened and the oven was allowed reach atmospheric pressure. The pans were removed and weighed. The water content was calculated as follows:

Wet weight=combined wet weight of pan and lenses−weight of weighing pan

Dry weight=combined dry weight of pan and lens− weight of weighing pan

% water content wet weight=(wet weight−dry weight)×100

The average and standard deviation of the water content are calculated for the samples are reported.

Oxygen permeability (Dk) may be determined by the polarographic method generally described in ISO 18369-4: 2006, but with the following variations. The measurement is conducted at an environment containing 2.1% oxygen. This environment is created by equipping the test chamber with nitrogen and air inputs set at the appropriate ratio, for example 1800 ml/min of nitrogen and 200 ml/min of air. The t/Dk is calculated using the adjusted pO2. Borate buffered saline was used. The dark current was measured by using a pure humidified nitrogen environment instead of applying MMA lenses. The lenses were not blotted before measuring. Four lenses with uniform thickness in the measurement area were stacked instead of using lenses of varied thickness. The L/Dk of 4 samples with significantly different thickness values are measured and plotted against the thickness. The inverse of the regressed slope is the preliminary Dk of the sample. If the preliminary Dk of the sample is less than 90 barrer, then an edge correction of (1+(5.88(CT in cm))) is applied to the preliminary L/Dk values. If the preliminary Dk of the sample is greater than 90 barrer, then an edge correction of (1+(3.56(CT in cm))) is applied to the preliminary L/Dk values. The edge corrected L/Dk of the 4 samples are plotted against the thickness. The inverse of the regressed slope is the Dk of the sample. A curved sensor was used in place of a flat sensor. The resulting Dk value is reported in barrers.

Lipocalin uptake can be measured using the following solution and method. The lipocalin solution contained B Lactoglobulin (Lipocalin) from bovine milk (Sigma, L3908) solubilized at a concentration of 2 mg/ml in phosphate saline buffer (Sigma, D8662) supplemented by sodium bicarbonate at 1.37 g/l and D-Glucose at 0.1 g/l.

Three lenses for each example were tested using the lipocalin solution, and three were tested using PBS as a control solution. The test lenses were blotted on sterile gauze to remove packing solution and aseptically transferred, using sterile forceps, into sterile, 24 well cell culture plates (one lens per well) each well containing 2 ml of lipocalin solution. Each lens was fully immersed in the solution. Control lenses were prepared using PBS as soak solution instead of lipocalin. The plates containing the lenses immersed in lipocalin solution as well as plates containing control lenses immersed in PBS, were parafilmed to prevent evaporation and dehydration, placed onto an orbital shaker and incubated at 35° C., with agitation at 100 rpm for 72 hours. After the 72 hour incubation period the lenses were rinsed 3 to 5 times by dipping lenses into three (3) separate vials containing approximately 200 ml volume of PBS. The lenses were blotted on a paper towel to remove excess PBS solution and transferred into sterile 24 well plates each well containing 1 ml of PBS solution.

Lipocalin uptake can be determined using on-lens bicinchoninic acid method using QP-BCA kit (Sigma, QP-BCA) following the procedure described by the manufacturer (the standards prep is described in the kit) and is calculated by subtracting the optical density measured on PBS soaked lenses (background) from the optical density determined on lenses soaked in lipocalin solution. Optical density was measured using a Synergyll Micro-plate reader capable for reading optical density at 562 nm.

Mucin uptake can be measured using the following solution and method. The Mucin solution contained Mucins from bovine submaxillary glands (Sigma, M3895-type 1-S) solubilized at a concentration of 2 mg/ml in phosphate saline buffer (Sigma, D8662) supplemented by sodium bicarbonate at 1.37 g/l and D-Glucose at 0.1 g/l.

Three lenses for each example were tested using Mucin solution, and three were tested using PBS as a control solution. The test lenses were blotted on sterile gauze to remove packing solution and aseptically transferred, using sterile forceps, into sterile, 24 well cell culture plates (one lens per well) each well containing 2 ml of Mucin solution. Each lens was fully immersed in the solution. Control lenses were prepared using PBS as soak solution instead of lipocalin.

The plates containing the lenses immersed in Mucin as well as plates containing control lenses immersed in PBS were parafilmed to prevent evaporation and dehydration, placed onto an orbital shaker and incubated at 35° C., with agitation at 100 rpm for 72 hours. After the 72 hour incubation period the lenses were rinsed 3 to 5 times by dipping lenses into three (3) separate vials containing approximately 200 ml volume of PBS. The lenses were blotted on a paper towel to remove excess PBS solution and transferred into sterile 24 well plates each well containing 1 ml of PBS solution.

Mucin uptake can be determined using on-lens bicinchoninic acid method using QP-BCA kit (Sigma, QP-BCA) following the procedure described by the manufacturer (the standards prep is described in the kit) and is calculated by subtracting the optical density measured on PBS soaked lenses (background) from the optical density determined on lenses soaked in Mucin solution. Optical density was measured using a Synergyll Micro-plate reader capable for reading optical density at 562 nm.

Cell viability can be evaluated in vitro using a reconstituted corneal epithelium tissue construct. The tissue construct was a full thickness corneal epithelium (corneal epitheliam tissue from Skinethics) reconstituted and grown in vitro on a polycarbonate insert at the air liquid interface to form a fully stratified epithelial construct.

For the evaluation of lenses a punch biopsy (0.5 $cm^2$) of the lens was applied topically onto the tissue followed by a 24-hour incubation at 37° C., 5% $CO_2$. The lens biopsy was removed, and tissue was washed with PBS. Cell viability was then measured using the MTT colorimetric assay (Mosman, T. Rapid colorimetric assay for cellular growth and survival: application to proliferation and cytotoxicity assays. J. Immunol. Methods, 65; 55-63 (1983)): tissues were incubated in the presence of MTT for 3 hours at 37° C., 5% $CO_2$, followed by extraction of the tissues in isopropyl alcohol. Absorbance of the isopropyl alcohol extracts was then measured at 550 nm using a microplate reader. Results were expressed as a percentage of the PBS control (tissues treated with PBS versus lens-treated tissues).

For the evaluation of solutions 30 μg of solution was applied topically onto the tissue. The rest of the cell viability was as described for lenses. Each evaluation was done in triplicate.

Lipid uptake was measured as follows:

A standard curve was set up for each lens type under investigation. Tagged cholesterol (cholesterol labeled with NBD ([7-nitrobenζ-2-oxa-1,3-diazol-4-yl], CH-NBD; Avanti, Alabaster, Ala.)) was solubilized in a stock solution of 1 mg/mL lipid in methanol at 35° C. Aliquots were taken from this stock to make standard curves in phosphate-buffered saline (PBS) at pH 7.4 in a concentration range from 0 to 100 micg/mL.

One milliliter of standard at each concentration was placed in the well of a 24-well cell culture plate. 10 lenses of each type were placed in another 24-well plate and soaked alongside the standard curve samples in 1 mL of a concentration of 20 micg/ml of CH-NBD. Another set of lenses (5 lenses) were soaked in PBS without lipids to correct for any autofluorescence produced by the lens itself. All concentrations were made up in phosphate buffered saline (PBS) at pH 7.4. Standard curves, test plates (containing lenses soaked in CH-NBD) and control plates (containing lenses soaked in PBS) were all wrapped in aluminum foil to maintain darkness and were incubated for 24 hours, with agitation at 35.C. After 24 hours the standard curve, test plates and control plates were removed from the incubator. The standard curve plates were immediately read on a micro-plate fluorescence reader (Synergy HT)).

The lenses from the test and control plates were rinsed by dipping each individual lens 3 to 5 times in 3 consecutive vials containing approximately 100 ml of PBS to ensure that only bound lipid would be determined without lipids carryover. The lenses were then placed in a fresh 24-well plate containing 1 mL of PBS in each well and read on the fluorescence reader. After the test samples were read, the PBS was removed, and 1 mL of a fresh solution of CH-NBD were placed on the lenses in the same concentrations as previously mentioned and placed back in the incubator at 35° C., with rocking, until the next period. This procedure was repeated for 15 days until complete saturation of lipids on lenses. Only the lipid amount obtained at saturation was reported.

Lysozyme uptake can be measured as follows: The lysozyme solution used for the lysozyme uptake testing contained lysozyme from chicken egg white (Sigma, L7651) solubilized at a concentration of 2 mg/ml in phosphate saline buffer supplemented by Sodium bicarbonate at 1.37 g/l and D-Glucose at 0.1 g/l.

The lipocalin solution contained B Lactoglobulin (Lipocalin) from bovine milk (Sigma, L3908) solubilized at a concentration of 2 mg/ml in phosphate saline buffer supplemented by Sodium bicarbonate at 1.37 g/l and D-Glucose at 0.1 g/l.

Three lenses for each example were tested using each protein solution, and three were tested using PBS as a control solution. The test lenses were blotted on sterile gauze to remove packing solution and aseptically transferred, using sterile forceps, into sterile, 24 well cell culture plates (one lens per well) each well containing 2 ml of lysozyme solution. Each lens was fully immersed in the solution. 2 ml of the lysozyme solution was placed in a well without a contact lens as a control.

The plates containing the lenses and the control plates containing only protein solution and the lenses in the PBS, were parafilmed to prevent evaporation and dehydration, placed onto an orbital shaker and incubated at 35° C., with agitation at 100 rpm for 72 hours. After the 72 hour incubation period the lenses were rinsed 3 to 5 times by dipping lenses into three (3) separate vials containing approximately 200 ml volume of PBS. The lenses were blotted on a paper towel to remove excess PBS solution and transferred into sterile conical tubes (1 lens per tube), each tube containing a volume of PBS determined based upon an estimate of lysozyme uptake expected based upon on each lens composition. The lysozyme concentration in each tube to be tested needs to be within the albumin standards range as described by the manufacturer (0.05 microgram to 30 micrograms). Samples known to uptake a level of lysozyme lower than 100 μg per lens were diluted 5 times. Samples known to uptake levels of lysozyme higher than 500 μg per lens (such as etafilcon A lenses) are diluted 20 times.

1 ml aliquot of PBS was used for all samples other than etafilcon. 20 ml were used for etafilcon A lens. Each control lens was identically processed, except that the well plates contained PBS instead of either lysozyme or lipocalin solution.

Lysozyme and lipocalin uptake was determined using on-lens bicinchoninic acid method using QP-BCA kit (Sigma, QP-BCA) following the procedure described by the manufacturer (the standards prep is described in the kit) and is calculated by subtracting the optical density measured on PBS soaked lenses (background) from the optical density determined on lenses soaked in lysozyme solution.

Optical density can be measured using a Synergyll Microplate reader capable for reading optical density at 562 nm.

The following abbreviations will be used throughout the Preparations and Examples and have the following meanings.

ACA1 3-acrylamidopropionic acid;
ACA2 5-acrylamidopentanoic acid;
AIBN 2,2'-azobisisobutyronitrile (Sigma-Aldrich)
4-BBB 4-(bromomethyl)benzoyl bromide (Sigma-Aldrich);
DMA N,N-dimethylacrylamide (Jarchem)
Irgacure-819 bis(2,4,6-trimethylbenzoyl)-phenylphosphineoxide (Ciba Specialty Chemicals);
KX potassium O-ethyl xanthogenate;
mPDMS monomethacryloxypropyl terminated mono-n-butyl terminated polydimethylsiloxane (800-1000 MW);
NaHTTC sodium hexyltrithiocarbonate;
HBTTC S-hexyl-S'-benzyl-trithiocarbonate, prepared in Preparation 4
MBA N,N'-methylenebisacrylamide (Sigma Aldrich)
MBMA N,N'-methylene bismethacrylamide (TCI)
NVP N-vinylpyrrolidone (Acros Chemical), further purified via vacuum distillation;
HO-mPDMS mono-(2-hydroxy-3-methacryloxypropyl)-propyl ether terminated polydimethylsiloxane (400-1000 MW));
SiGMA 2-methyl-,2-hydroxy-3-[3-[1,3,3,3-tetramethyl-1-[(trimethylsilyl)oxy]disiloxanyl]propoxy]propyl ester;
TRIS-VC tris(trimethylsiloxy)silylpropyl vinyl carbamate;
$V_2D_{25}$ a silicone-containing vinyl carbonate describe at col. 4, lines 33-42 of U.S. Pat. No. 5,260,000
D3O 3,7-dimethyl-3-octanol
HPMA N-(2-hydroxypropyl) methacrylamide (Polysciences, Inc.)
(VA-044) 2,2'-azobis[2-(2-imidazoliN-2-yl)propane]dihydrochloride, Wako Specialty Chemicals
DPBS Dulbecco's Phosphate Buffered Saline 1× (Cellgro)

Borate buffer is an ophthalmic solution containing the following components

| Component | Wt % |
| --- | --- |
| Deionized Water | 98.48 |
| Sodium Chloride | 0.44 |
| Boric Acid | 0.89 |
| Sodium Borate Decahydrate | 0.17 |
| Ethylenediamine Tetraacetate (EDTA) | 0.01 |

Preparation 1. Synthesis of poly(N-(2-hydroxypropyl methacrylamide) (PHPMA) Nanogel via RAFT Polymerization HPMA was dissolved in hot acetonitrile, filtered and precipitated. The CTA, 4-cyano-4-(ethyltrithiocarbonate) pentanoic acid (ETP), was obtained from Poly Sciences and used as received. MBMA, VA-044, and Dulbecco's Phosphate Buffered Saline were used as received, in the amounts listed in Table, 1.

TABLE 1

| Materials | Amount |
| --- | --- |
| HPMA | 100 g |
| MBMA | 850 mg |
| ETP | 615 mg |
| VA-044 | 2.25 g |
| DPBS | 200 g |

The polymerization solution was prepared by adding HPMA, CTA, MBMA and buffer to a 500 mL round-bottom three neck flask. The flask was connected to a mechanical stirrer and closed to the atmosphere, and nitrogen was bubbled through the monomer mix. A heating mantle was placed under the flask and it was warmed to 50° C. VA-044 was weighed in a 20 mL vial and dissolved in 8 g of DPBS to form an initiator solution. It was purged of $O_2$ with $N_2$ in an $N_2$ atmosphere for 30 minutes. After one hour of stirring and heating the monomer mix was completely dissolved and degassed. The initiator solution was then added to the monomer mix via syringe.

The polymerization solution was cured under an $N_2$ atmosphere at 50° C. for 180 minutes with continuous stirring. The temperature was monitored to make sure it did not rise above 54° C. The heating mantle was removed when necessary to reduce heat.

After curing, the resulting solid polymerized material was added drop-wise to vigorously stirring acetone to precipitate the product. A 2 L flask filled with 1600 mL of acetone was used. The precipitated polymer was dried in vacuo for several hours. It was further purified via tangential flow filtration. The polymer was analyzed for MW and MWD via SEC-MALLS.

Preparation 2. Synthesis of poly(N,N-dimethylacrylamide) (PDMA) Nanogel via RAFT Polymerization Materials:

DMA was further purified via vacuum distillation. The CTA, S-benzyl-S'-hexyl-trithiocarbonate (HBTTC) was prepared according to Preparation 4. The MBA, and AIBN were used as received, in the amounts shown in Table 2.

TABLE 2

| Materials | Amount |
| --- | --- |
| DMA | 125.0 g |
| HBTTC | 3.59 g |
| AIBN | 104 mg |
| MBA | 2.46 g |
| 1-Propanol | 125.0 g |

125 g of DMA and 1-propanol were weighed in a 500 mL three-neck flask. Next, HBTTC and MBA were added, and the solution was purged with $N_2$ for one hour to remove $O_2$ while stirring with a mechanical stirrer. AIBN (CTA to initiator ratio=20) was weighed into a vial and dissolved in 5 g of 1-propanol. It was then purged with $N_2$ in an $N_2$ atmosphere for one hour to remove $O_2$ from the solution.

The solution was heated to 60° C., and the initiator solution was injected into the monomer solution. The temperature of the reaction mixture was monitored throughout the polymerization. It was never allowed to rise above 70° C. A water bath was used to cool the flask when necessary. The total reaction time was 210 minutes. The reaction mixture was quenched by exposing it to air and bubbling air through it.

After curing, the polymer was added drop-wise to vigorously stirring diethyl ether to precipitate the product. A 2 L flask containing 1600 mL ether was used. The precipitated polymer was dried in vacuo for several hours. It was further purified via Soxhlet extraction in hexanes for six days. The polymer was analyzed for MW and MWD via SEC-MALLS.

Preparation 3. Synthesis of Linear PHPMA Homopolymer

The HPMA and V-501 were used as received.

650 g of HPMA and 4875 g DI water were added to a 12 L flask equipped with a sparge tube, overhead stirrer, and temperature probe. The resulting solution was sparged with $N_2$ and stirred at 250 rpm for two hours while allowing the solution temperature to reach 65° C.

Once the reaction at reached 65° C., 0.85 g V-501 was added and the solution temperature was raised to 70° C. and held at that temperature for 24 hours. The heat was removed and the reaction was allowed to cool to 40° C.

The resulting polymer solution was divided into 600 mL portions and each portion was precipitated from 2 L of acetone. The isolated solid polymer was filtered and dried overnight in a hood, then broken up and dried over 24-48 hours. Because the polymer was still wet, it was placed in a Waring blender with 2 L of acetone (in 5 portions) and blended for 2 minutes to remove additional water. The solid ground polymer was once again isolated and dried for 24-48 hours at 50-55 degrees C. The polymer was then dissolved in 4500 g of methanol and precipitated (portion-wise) from acetone in a Waring blender. The high shear precipitate resulted in a fine powder which was easily isolated via filtration and dried to a constant weight over 48 hours. The final polymer yield was 84.9%. The polymer was analyzed for MW and MWD via SEC-MALLS.

Preparation 4. Synthesis of S-hexyl-S'benzyl-trithiocarbonate (HBTTC)

Sodium in kerosene (Sigma Aldrich) was added in pieces slowly under nitrogen to 20 mL of methanol to form sodium methoxide. The resulting solution was added to a flask containing 1-hexanethiol (Sigma Aldrich) in several aliquots. Carbon disulfide (Sigma Aldrich) was added dropwise via syringe. The solution turned yellow immediately. The solution was allowed to react for 15 minutes. Benzyl bromide (Sigma Aldrich) was then added dropwise via syringe. A precipitate formed immediately. The reaction was allowed to proceed for two hours. A yellow oil eventually formed at the bottom of the flask. The methanol was roto-vapped off and the product was separated from the sodium salt with deionized water and hexane. The aqueous layer was approximately 50 mL and was extracted three times with 50 mL of hexane. The hexane was combined, dried over $Na_2SO_4$ and reduced to dryness via rotary evaporation. $^1$H NMR (300 MHz, $CDCl_3$): δ (ppm) 0.875-1.125 (t, 3H), 1.25-1.63 (m, 6H), 1.63-1.95 (m, 2H), 3.25-3.63 (t, 2H), 4.63-4.8 (s, 2H), 7.25-7.5 (m, 5H).

Examples 1-2 and Comparative Examples 1 and 2

Senofilcon A lenses were removed from their packages and transferred to glass vials containing 3 mL of BBPS (Comparative Example 1); 3 mL of BBPS containing 5000 ppm of the WSC polymers formed in Preparations 1-2 (Examples 1 and 2, respectively), or 3 mL of BBPS and the linear polymer of Preparation 3 (Comparative Example 2). The lenses were capped and crimp-sealed and subsequently sterilized at 124° C. for 30 minutes. The following biometrics data was obtained for lenses treated with each of the polymers, and for untreated senofilcon A lenses (Comparative Example 1). The results are shown in Table 4, below.

TABLE 4

| Property | CE 1 | Ex 1 | Ex 2 | CE 2 |
| --- | --- | --- | --- | --- |
| Polymer | N/A | WSC PHPMA | WSC PDMA | Linear HPMA |
| Lipid Uptake (μg/lens) | 31.89 | 6 | 6 | 17.2 |
| Sessile Drop | 48.3° | 44.03° | 40.35° | 51.6° |
| CoF | 1.0 | 1.67 | 0.84 | 2.05 |
| Mucin (μg/lens) | 5.23 | 2.25 | 2.94 | 3.23 |
| Lipocalin (μg/lens) | 3.32 | 2.06 | 1.99 | 2.4 |

The WSC polymers of the present invention provide dramatically reduced lipid uptake compared to both the untreated control lens of Comparative Example 1, and lenses treated with the linear PDMA polymer of Comparative Example 2. Mucin and lipocalin uptake of the lenses of the present invention were also reduced compared to the control and the linear PDMA polymer.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A process comprising contacting a contact lens with a solution comprising a lipid uptake reducing amount of at least one water soluble, crosslinked copolymer under contacting conditions suitable to associate said copolymer with said contact lens; wherein said cross-linked copolymer comprises a plurality of crosslinked primary polymer chains each having a degree of polymerization in the range of about 10 to about 10,000, wherein said cross-linked copolymer does not comprise repeating units derived from a substituted or unsubstituted acrylic acid bonded directly to the polymer backbone.

2. The process of claim 1 wherein said contact lens comprises a silicone hydrogel contact lens.

3. The process of claim 1 wherein said water soluble, cross-linked copolymer has a cross-linker to primary polymer chain molar ratio in the range of about 0.01 to about 3.

4. The process of claim 1 wherein said lipid uptake reducing amount is at least about 10 ppm.

5. The process of claim 1 wherein said lipid uptake reducing amount is in the range of about 10 ppm to about 10,000 ppm.

6. The process of claim 1 wherein the lipid uptake by the lens is no more than about 10 μg/lens.

7. The process of claim 1, wherein said primary polymer chains are selected from the group consisting of hydrophilic polymers and copolymers, proton donating polymers and copolymers, proton accepting polymers and copolymers, ionic polymers and copolymers, complexing polymers and copolymers, stimuli responsive polymers and copolymers and mixtures thereof.

8. The process of claim 7, wherein the proton donating polymers and copolymers comprise one or more alcohols.

9. The process of claim 7, wherein the proton accepting polymers and copolymers comprise one or more amides.

10. The process of claim 7, wherein the ionic polymers and copolymers comprise one or more of the following: a carboxylate, a sulfonate, an ammonium salt, and a phosphonium salt.

11. The process of claim 7, wherein the complexing polymers and copolymers comprise one or more boronic acid functionalities and/or hydroxyl functionalities.

12. The process of claim 7, wherein the stimuli responsive polymers and copolymers comprise a polymer selected from the group consisting of temperature-responsive polymers, pH responsive polymers, electrolyte responsive polymers, light responsive polymers and mixtures thereof.

13. The process of claim 12, wherein the temperature-responsive polymer is poly(N-isopropylacrylamide).

14. The process of claim 7 wherein the copolymers are both hydrophilic and proton donating.

15. The process of claim 14 wherein the copolymers comprise repeating units derived from the polymerization of at least one monomer selected from the group consisting of N-vinyl pyrrolidone, N,N-dimethyl acrylamide, and N-hydroxypropyl methacrylamide.

16. The process of claim 1 wherein the copolymers are formed from monomers selected from the group consisting of vinyl amides, vinyl lactones, vinylimides, vinyl lactams, hydrophilic (meth)acrylates, (meth)acrylamides, and mixtures thereof.

17. The process of claim 1 wherein said primary polymer chains are cross-linked by at least one cross-linking agent selected from the group consisting of an N,N'-alkylenebis(meth)acrylamide, polyalkyleneglycoldi(meth)acrylate, polyalkyleneglycoldi(meth)acrylamide, and combinations thereof.

18. The process of claim 1 wherein said primary polymer chains independently have a degree of polymerization in the range of about 50 to about 5,000.

19. The process of claim 1 wherein said primary polymer chains independently have a degree of polymerization in the range of about 100 to about 1000.

20. The process of claim 1 wherein said primary polymer chains independently have a degree of polymerization in the range of about 100 to about 500.

21. The process of claim 1 wherein said primary polymer chains independently have a degree of polymerization in the range of about 100 to about 300.

22. The process of claim 1 wherein said cross-linked copolymer has a cross-linker to primary polymer chain molar ratio in the range of about 0.01 to about 3.

23. The process of claim 1 wherein said primary polymer chains are cross-linked to other primary polymer chains of said hydrophilic nanogel having polydispersity indices (PDIs) of less than about 1.5.

24. The process of claim 22 wherein said primary polymer chains are cross-linked by covalent bonding, ionic bonding, hydrogen bonding, or a combination thereof.

25. The process of claim 1 wherein said primary polymer chains, $\zeta$, are represented by the formula

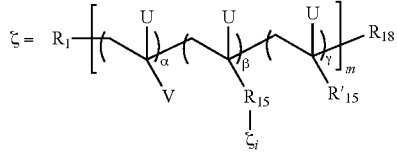

wherein $R_1$ is a divalent group selected from the group consisting of optionally substituted alkylene; optionally substituted saturated, unsaturated or aromatic carbocyclic or heterocyclic rings; optionally substituted alkylthio; optionally substituted alkoxy; or optionally substituted dialkylamino;

U is independently selected from the group consisting of hydrogen, halogen, $C_1$-$C_4$ alkyl which may be optionally substituted with hydroxyl, alkoxy, aryloxy (OR"), carboxy, acyloxy, aroyloxy ($O_2CR"$), alkoxy-carbonyl, aryloxy-carbonyl ($CO_2R"$) and combinations thereof;

V is independently selected from the group consisting of R", —$CO_2R"$, —COR", —CN, —$CONH_2$, —CONHR", —$CONR"_2$, —$O_2CR"$, —OR", cyclic and acyclic N-vinyl amides and combinations thereof;

R" is independently selected from the group consisting of optionally substituted $C_1$-$C_{18}$ alkyl, $C_2$-$C_{18}$ alkenyl, aryl, heterocyclyl, alkaryl wherein the substituents are independently selected from the group that consists of epoxy, hydroxyl, alkoxy, acyl, acyloxy, carboxy, carboxylate, sulfonic acid, and sulfonate, alkoxy- or aryloxy-carbonyl, isocyanato, cyano, silyl, halo, dialkylamino; phosphoric acids, phosphates, phosphonic acids, phosphonates and combinations thereof;

$R_{15}'$ and $R_{15}$ are residues of hydrophilic, free radical reactive cross-linking agents;

$R_{18}$ is a controlled radical polymerization agent;

$\zeta_i$ is another primary chain, are mole fractions, and $\alpha$ is equal to about 0.85 to about 0.999, $\beta$ is not 0, and the mole fractions of $\beta$ and $\gamma$ combined are about 0.15 to about 0.001.

26. The process of claim 25 wherein said primary polymer chains, $\zeta$, are represented by the formula

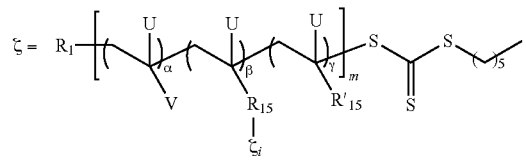

Wherein $R_1$, U, V, $R_{15}$, $R_{15'}$, $\alpha$, $\beta$, $\gamma$ and m are as defined in claim 25.

27. The process of claim 25 or 26 wherein $R_1$ is selected from the group consisting of 4-cyanopentanoate, isobutanoic, or a benzylic group.

28. The process of claim 25 or 26 wherein $R_1$ is selected from the group consisting of a cyano-methy or cumyl group.

29. The process of claim 25 or 26 wherein $R_1$ is polyvalent.

30. The process of claim 25 or 26 wherein U is selected from H or methyl.

31. The process of claim 25 or 26 wherein R" is selected from the group consisting of methyl, —$CH_2OH$, —$CH_2CH_2OH$, —$CH_2CH_2CH_2OH$, —$CH_2$—$CO_2^-$, —$CH_2CH_2$—$CO_2^-$, —$CH_2CH_2CH_2$—$CO_2^-$, —$CH_2CH_2CH_2CH_2$—$CO_2^-$, —$CH_2CH_2CH_2CH_2CH_2$—$CO_2^-$, —$CH_2$—$SO_3^-$, —$CH_2CH_2$—$SO_3^-$, —$CH_2CH_2CH_2$—$SO_3^-$, —$CH_2CH_2CH_2CH_2$—$SO_3^-$, —$CH_2CH_2CH_2CH_2CH_2$—$SO_3^-$, —$(CH_3)_2$—$CH_2$—$CO_2^-$, —$(CH_3)_2$—$CH_2$—$SO_3H$, —$CH_2CH_2CH_2$—$^+N(CH_3)_2$—$CH_2CH_2$—$CO_2^-$, —$CH_2CH_2$—$^+N(CH_3)_2$—$CH_2CH_2$—$CO_2^-$, —$CH_2CH_2CH_2$—$^+N(CH_3)_2$—$CH_2CH_2CH_2$—$SO_3^-$, —$CH_2CH_2$—$^+N(CH_3)_2$—$CH_2CH_2CH_2$—$SO_3^-$, —$CH_2CH_2CH_2$—$^+N(CH_3)_2$—$CH_2CH_2CH_2$—$PO_3^{-2}$, —$CH_2CH_2$—$^+N(CH_3)_2$—$CH_2CH_2CH_2$—$PO_3^{-2}$, —$CH_2CH_2CH_2$—$^+N(CH_3)_2$—$CH_2CH_2$—$PO_3^{-2}$—$CH_2CH_2$—$^+N(CH_3)_2$—$CH_2CH_2$—$PO_3^{-2}$, and combinations thereof.

32. The process of claim 30 wherein V is selected from the group consisting of pyrrolidonyl, piperidonyl, 2-caprolactam, 3-methyl-2-caprolactam, 3-methyl-2-piperidonyl, 4-methyl-2-piperidonyl, 4-methyl-2-caprolactam, 3-ethyl-2-pyrrolidonyl, 4,5-dimethyl-2-pyrrolidonyl, imidazolyl, N—N-dimethylamido, amido, N,N-bis(2-hydroxyethyl) amido, -cyano, N-isopropyl amido, acetate, carboxypolyethylene glycol, N-(2-hydroxypropyl)amido, N-(2-hydroxyethyl) amido, carboxyethyl phosphorylcholine, 3-(dimethyl (4-benzyl)ammonio)propane-1-sulfonate 3-((3-amidopropyl)dimethylammonio)propane-1-sulfonate 3-((3-(carboxy)propyl)dimethylammonio)propane-1-sulfonate N-methylacetamide, -acetamide, N-methylpropionamide, N-methyl-2-methylpropionamide, 2-methylpropionamide, N,N'-dimethylurea, and the like, and mixtures thereof.

33. The process of claim 30 wherein V is selected from the group consisting of —N—$(CH_3)_2$, pyrrolidonyl, —CON$(CH_3)_2$, N-(2-hydroxyethyl) amido or —$N(CH_3)COCH_3$.

34. The process of claim 25 or 26 wherein $R_{15}$ and $R_{15}'$ cross-linking agents are free of dimethylsiloxane groups.

35. The process of claim 25 or 26 wherein $R_{15}$ and $R_{15}'$ are polymerization residues of at least one crosslinking agent selected from the group consisting of N,N'-alkylenebis(meth)acrylamides;

polyalkyleneglycoldi(meth)acrylates, polyalkyleneglycoldi(meth)acrylamides, triallyl cyanurate, 1,3-divinylimidazolidin-2-one, and 3,3"alkylenebis(1-vinylpyrrolidin-2-one), wherein the alkylene has 1-12 carbons, and mixtures thereof.

36. The process of claim 25 or 26 wherein $R_{15}$ and $R_{15}'$ are polymerization residues of at least one crosslinking agent selected from the group consisting of N,N'-methylenebis(meth)acrylamide; N,N'-ethylenebis(meth)acrylamide; N,N'-propylenebis(meth)acrylamide; N,N'-butylenebis(meth)acrylamide; N,N'-pentamethylenebis(meth)acrylamide; N,N' hexamethylenebis(meth)acrylamide; ethylene glycol di(meth)acrylate, triethylene glycol di(meth)acrylate, tetra-ethylene glycol di(meth)acrylate; N,N'-(oxybis(ethane-2,1-diyl))diacrylamide N,N'-(((oxybis(ethane-2,1-diyl))bis(oxy))bis(ethane-2,1-diyl))diacrylamide, triallyl cyanurate, 1,3-divinylimidazolidin-2-one and mixtures thereof.

37. The process of claim 25 or 26 wherein $R_{18}$ is a RAFT or ATRP control agent.

38. The process of claim 25 or 26 wherein a is about 0.92 to about 0.999, and the combined mole fraction of β and γ is about 0.08 to about 0.001.

39. The process of claim 25 or 26 wherein a is about 0.95 to about 0.999, and the combined mole fraction of β and γ is about 0.05 to about 0.001.

40. The process of claim 25 or 26 wherein a is about 0.97 to about 0.999, and the combined mole fraction of β and γ is about 0.025 to about 0.001.

41. The process of claim 25 or 26 wherein said water soluble, crosslinked polymer is free of substrate associative blocks.

42. The process of claim 25 or 26 wherein at least about 20% of V are derived from N-(2-hydroxypropyl) (meth)acrylamide.

43. The process of claim 25 or 26 wherein V comprises repeating units derived from comonomers.

44. The process of claim 25 or 26 wherein V is substantially free of anionic groups.

45. The process of claim 25 or 26 wherein V is free of anionic groups.

46. The process of claim 43 wherein said comonomers are selected from the group consisting of hydrophilic monomers, hydrophobic monomers, anionic monomers, cationic monomers, zwitterionic monomers, stimuli responsive monomers and combinations thereof.

47. The process of claim 43 wherein said comonomers are selected from the group consisting of anionic monomers, zwitterionic monomers and combinations thereof.

* * * * *